US006352644B1

(12) United States Patent
Hawthorne et al.

(10) Patent No.: US 6,352,644 B1
(45) Date of Patent: Mar. 5, 2002

(54) METHOD OF MANIPULATING THE CHEMICAL PROPERTIES OF WATER TO IMPROVE THE EFFECTIVENESS OF A DESIRED PROCESS

(75) Inventors: Steven B. Hawthorne; David J. Miller; Arnaud Jean-Marie Lagadec, all of Grand Forks, ND (US); Peter James Hammond, York; Anthony Alan Clifford, Leeds, both of (GB)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 0 days.

(21) Appl. No.: 09/441,872

(22) Filed: Nov. 17, 1999

Related U.S. Application Data

(63) Continuation-in-part of application No. 08/936,183, filed on Sep. 24, 1997, now Pat. No. 6,001,256.
(60) Provisional application No. 60/026,479, filed on Sep. 25, 1996.

(51) Int. Cl.[7] .................. B01D 11/00; B01D 11/02; B01D 11/04
(52) U.S. Cl. ............... 210/643; 210/633; 210/634; 210/635; 210/690; 210/737; 210/774
(58) Field of Search .................. 210/633, 634, 210/635, 643, 690, 694, 737, 774

(56) References Cited

U.S. PATENT DOCUMENTS 5,449,820 A * 9/1995 Fukui et al. ............... 562/486
6,090,291 A * 7/2000 Akai et al. ................. 210/669

OTHER PUBLICATIONS

Bunte, G., et al., Hydrolysis and Oxidation of Hexachlorocyclohexane in Sub- and Supercritical Water, Proceedings of the 3rd Int'l. Symp. on Supercritical Fluids, Strasbourg, France, Oct. 1994.

Wang et al., The Influence of High–Temperataure Water on the Reaction Pathways of Nitroanilines, *Journal of Supercritical Fluids,* 1995, 8, 236–249.

Iyer, et al., Hydrothermal Reactions of 1–Nitrobutane in High–Temperature Water, *Journal of Supercritical Fluids,* 1996, 9, 26–32.

Holliday, et al., Organic Synthesis in Subcritical Water Oxidation of Alkyl Aromatics, *Journal of Supercritical Fluids,* 1998, 12, 255–260.

Tester, et al., Chemical Reactions and Phase Equilibria of Model Halocarbons and Salts in Sub– and Supercritical Water (200–300 bar, 100–600° C), *Journal of Supercritical Fluids,* 1998, 13, 225–240.

Yak, et al., Reductive Dechlorination of Polychlorinated Biphenyls by Zerovalent Iron in Subcritical Water, *Environmental Science and Technology,* 1999, vol. 33, No. 8, 1307–1310.

* cited by examiner

*Primary Examiner*—John Kim
(74) *Attorney, Agent, or Firm*—Needle & Rosenberg, P.C.

(57) ABSTRACT

The method of the present invention is adapted to manipulate the chemical properties of water in order to improve the effectiveness of a desired process. The method involves heating the water in the vessel to subcritical temperatures between 100° to 374° C. while maintaining sufficient pressure to the water to maintain the water in the liquid state. Various physiochemical properties of the water can be manipulated including polarity, solute solubility, surface tension, viscosity, and the disassociation constant. The method of the present invention has various uses including extracting organics from solids and semisolids such as soil, selectively extracting desired organics from liquids, selectively separating organics using sorbent phases, enhancing reactions by controlling the disassociation constant of water, cleaning waste water, removing organics from water using activated carbon or other suitable sorbents, and degrading various compounds.

28 Claims, 29 Drawing Sheets

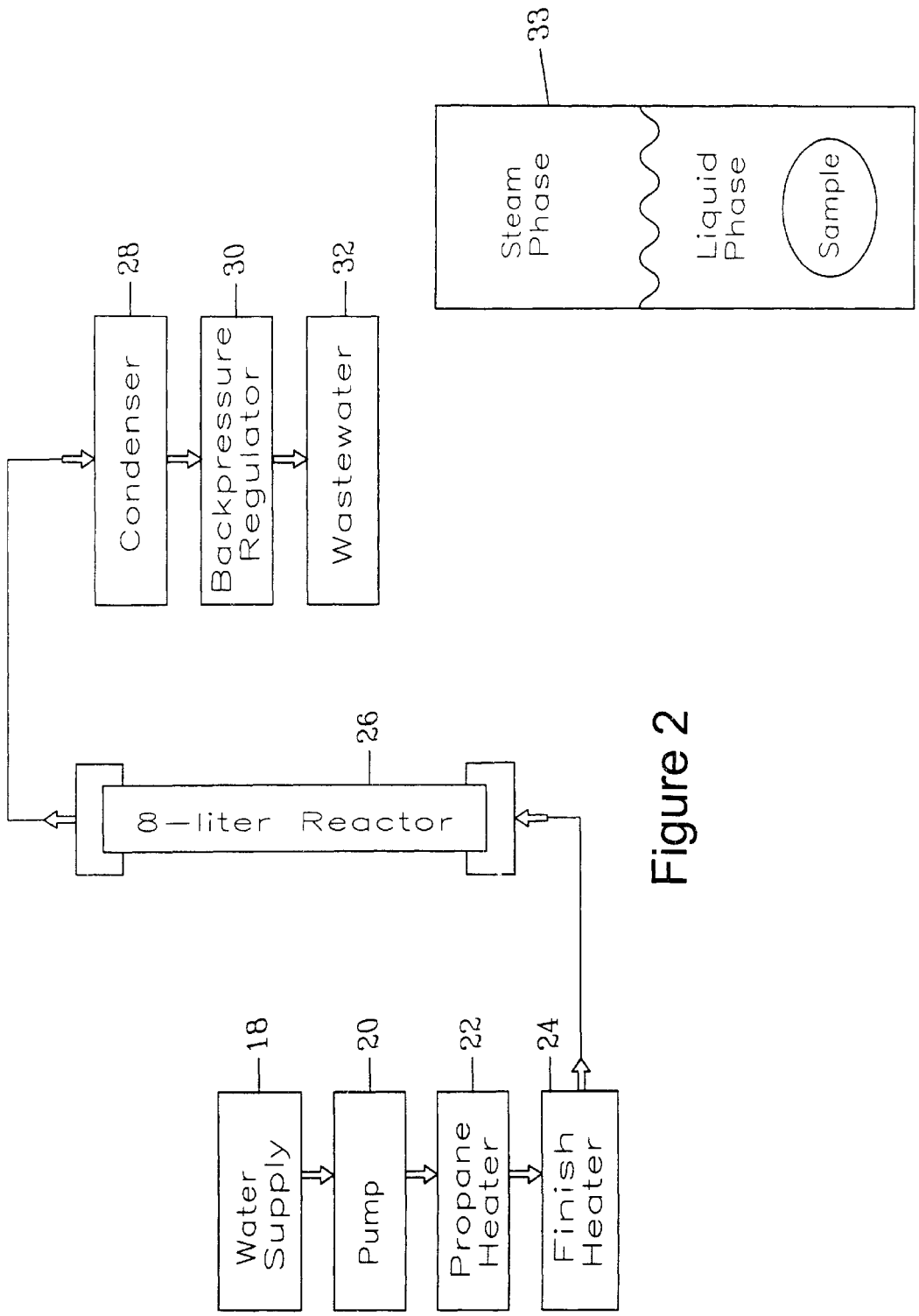

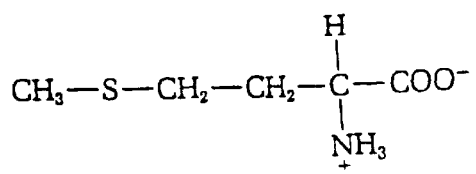
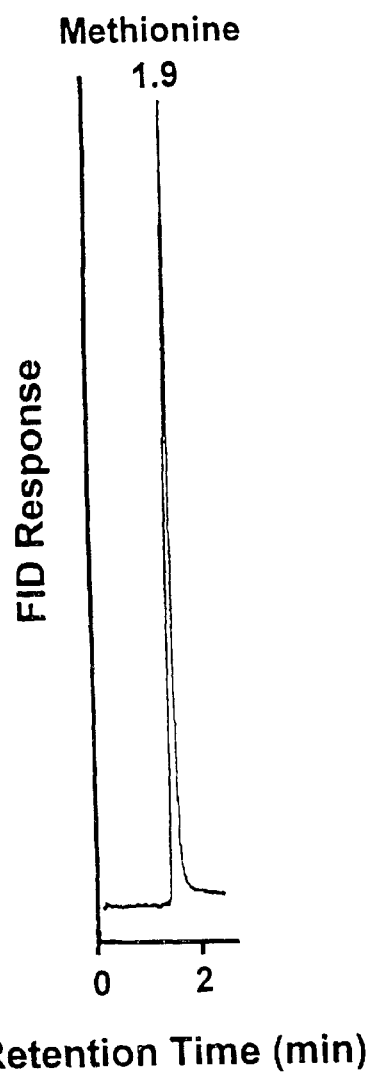
Figure 12B

METHOD OF MANIPULATING THE CHEMICAL PROPERTIES OF WATER TO IMPROVE THE EFFECTIVENESS OF A DESIRED PROCESS

CROSS-REFERENCE TO RELATED APPLICATIONS

This is a continuation-in-part of application Ser. No. 08/936,183, filed Sep. 24, 1997, U.S. Pat. No. 6,001,256, which claims the benefit of U.S. Provisional Application No. 60/026,479, filed Sep. 25, 1996, the disclosures of which are hereby incorporated by reference.

GRANT REFERENCE

This invention was developed with government support under U.S. Department of Energy Cooperative Agreement Nos. DE- and DE-FC21-94MC31388, thus the government may have certain rights in this invention.

FIELD OF THE INVENTION

The present invention relates to manipulating the physiochemical properties of water. More particularly, though not exclusively, the present invention relates to a method for using subcritical water to improve the effectiveness of a desired chemical process.

BACKGROUND OF THE INVENTION

Throughout the world there is a large need to clean contaminated materials. For example, it is often desired to extract organics as well as nonorganics and metals from solids and semi-solids. Examples include the removal of PAHs, PCBs, pesticides, and metals from soil. Contaminated soil may result from various things including agricultural chemicals, industrial pollution, chemical waste, etc. It is typically difficult and very expensive to remove these contaminants from the contaminated soil. Another example involves the extraction of mercury from contaminated soils. One prior art method of removing contaminants from solids or semisolids involves the use of organic solvents to dissolve the contaminants.

Many industrial processes use organic solvents for separations, reactions, and applications such as applying coatings. Such processes often result in emissions of the solvents and the associated emission control costs.

Another large problem involves the clean up of water. Polluted water or waste water often contains organic or non organic materials which must be removed to clean the water. One common prior art method of removing organics from water involves the use of activated carbon or other suitable sorbents. In an activated carbon filter, water is passed through the filter where the carbon collects the material to be removed from the water. It is well accepted that an activated carbon filter is less effective as the solubility in water of the material to be extracted increases. In other words, the effectiveness of an activated carbon filter is inversely proportional to the solubility of the contaminant in water.

The following references describe background material in detail and are incorporated by reference herein:

Hawthorne, S. B.; Yang, Y.; Miller, D. J., *Analytical Chemistry,* 1994, 66, 2912.

Yang, Y.; Bowadt, S.; Hawthorne, S. B.; Miller, D. J., *Analytical Chemistry,* 1995, 67, 4571.

Haar, L.; Gallagher, J. S.; Kell, G. S., *National Bureau of Standards/National Research Council Steam Tables;* Hemisphere Publishing Corp.: Bristol, 1984.

Melander, W. R.; Horvath, C., *High Performance Liquid Chromatography—Advances and Perspectives;* Vol. 2, Horvath, C., Ed.; Academic Press, Inc.: New York, 1980, pp 113–319.

SUMMARY OF THE INVENTION

A general feature of the present invention is the provision of a method for manipulating the physiochemical properties of water which overcomes problems found in the prior art.

A further feature of the present invention is the provision of a method of manipulating the physiochemical properties of water to improve the effectiveness of a desired chemical process by using subcritical water.

Other features of the invention are the following:

A method for manipulating physiochemical properties of water by subjecting the water to temperatures within the range of 100° C. to 374° C. while maintaining sufficient pressure to the water to maintain the water in the liquid state (these conditions are defined herein as subcritical water).

A method for extracting organics from solids and semi-solids using subcritical water.

A method for selectively extracting desired organics from nonaqueous liquids using subcritical water.

A method for selectively separating different organics using sorbent phases in subcritical water.

A method for enhancing reactions by controlling the disassociation constant of water.

A method for controlling the polarity of water.

A method for controlling the solubility of organic compounds and metals in water.

A method for controlling the viscosity of water.

A method for controlling the surface tension of water.

A method for removing organics from water based on lowered solubility upon cooling the water.

A method for removing organics from water using activated carbon under subcritical water conditions.

A method for degrading energetic (explosive) materials.

A method for dechlorinating chlorophenols.

A method for dechlorinating polychlorinated biphenyls (PCBs).

A method for dehalogenating halogenated solvents.

A method for removal of organic pollutants from water from subcritical water processes.

A method for removal of PCBs from soil or sediment.

A method for degrading halogen-containing plastics or polymers.

A method for degrading non-halogen-containing plastics or polymers.

A method for removal of contaminants from polymers or plastics.

A method for decontaminating bulk materials in situ.

A method for producing flavors and fragrances by reaction.

These and other objects, features, and advantages will become apparent after review of the following description and claims of the invention which follow.

The method of the present invention is used to manipulate the physiochemical properties of water in order to improve the effectiveness of a desired chemical process. The method involves heating water to temperatures in the range of 100° C. to 374° C. while maintaining sufficient pressure to the water to maintain the water in the liquid state. The water may be maintained in a liquid state by either applying pressure or utilizing the steam/water equilibrium. The physiochemical properties manipulated by the method may include: the polarity of water, the surface tension of the water, the viscosity of the water, the solubility of solutes in the water, and the disassociation constant of the water.

BRIEF DESCRIPTION OF THE DRAWINGS

FIG. 2 is a block diagram of a subcritical water remediation unit.

FIG. 3 is a block diagram of a subcritical water device using steam/liquid equilibrium.

FIGS. 11 and 12A–12C are charts illustrating detector responses to various phenols and amino acids separated using subcritical water and a sorbent.

DETAILED DESCRIPTION OF THE PREFERRED EMBODIMENTS

The present invention will be described as it applies to its preferred embodiment. It is not intended that the present invention be limited to the described embodiment. It is intended that the invention cover all alternatives, modifications, and equivalencies which may be included within the spirit and scope of the invention.

When water is heated beyond 100° C. (the boiling point of water at atmospheric pressure), but is kept under sufficient pressure to maintain a liquid state, the water becomes "subcritical water" or hot/liquid water. This state of water continues as the water is heated up to 374° C. At higher temperatures, the water becomes supercritical and is not the subject of this invention. For the purposes of this description, the temperature range of subcritical water will be defined as being between the normal boiling point and the critical temperature of water (i.e., approximately 100° C. to 374° C.). The method of the present invention exploits the attractive properties of subcritical water under moderate pressures to, among other things, increase the solubilities of organic compounds by lowering the polarity of water and to enhance mass transfer of organic compounds from solids by lowering the water's viscosity and surface tension (described below). Only pure water is used, without the need for additives, to achieve solubility changes as great as ca. 1 million-fold.

Figure 1:
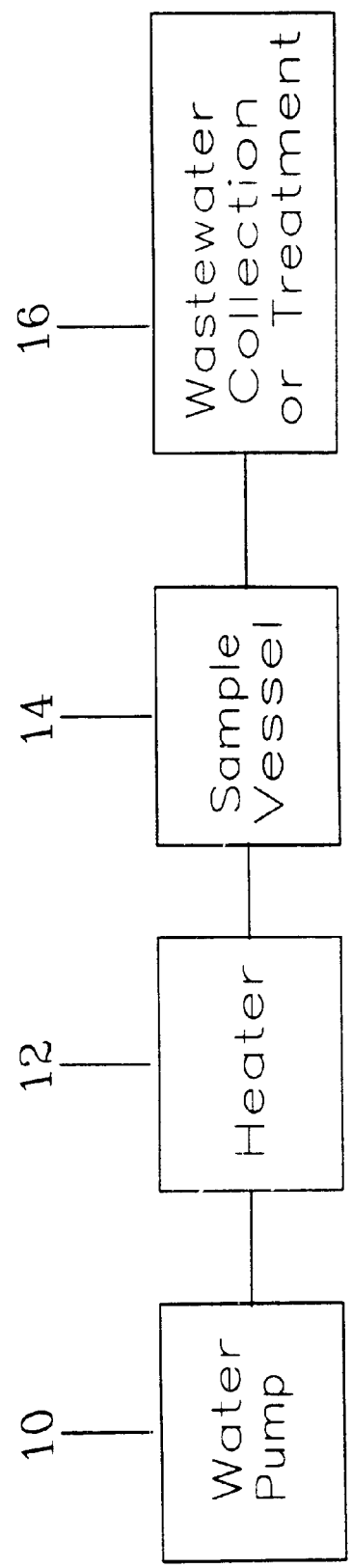
FIG. 1 is a block diagram of a subcritical water extraction unit.

FIG. 1 is a block diagram showing one possible subcritical water extraction unit. FIG. 1 shows a water pump 10, a heater 12, a sample vessel 14, and a wastewater collection or treatment device 16. Water is pressurized by the pump 10, heated by the heater 12, and is pumped into the sample vessel 14. The water is heated to a temperature in the range of 100° to 374° C. under pressure sufficient to maintain the water in a liquid state. The pressure is provided either by the pump 10 or by steam/water equilibrium (discussed below). When the steam/water equilibrium is utilized, an important safety note is to ensure that a sufficient headspace volume is available in the vessel to allow for the existence of the steam phase in order to avoid generating substantial pressure which could rupture the vessel causing damage or injury.

FIG. 2 is a more detailed block diagram of a subcritical water remediation unit. FIG. 2 shows a water supply 18, a pump 20, a propane-fired water heater 22, and a finish heater 24 connected to a heated vessel 26 (in this example, an 8-liter reactor). The vessel 26 is also connected to a condenser 28, a backpressure regulator 30, and a wastewater collection or treatment device 32. Heated water (100° to 374° C.) is pumped into the vessel 26 under sufficient pressure to maintain the liquid state. Again, the pressure is applied by the pump 20. An alternate system using the steam/water equilibrium to maintain a portion of the water in the liquid state is shown in FIG. 3. FIG. 3 is a block diagram of a heated closed vessel 33 used to generate subcritical water using steam/liquid equilibrium. As shown, the vessel 33 contains water in both a liquid phase and a steam phase. In this configuration, the vessel could be heated directly.

Various applications which use subcritical water have been verified experimentally. These applications (described in more detail below) include: (1) the remediation of soils, sediments, and sludges that are contaminated with organic or metallic pollutants, and may include a process where the extractant water can be cleaned for recycling without the need for cooling; (2) preparative extraction of biologically active chemicals from plant tissue; (3) removal of synthesis contaminants from commercial polymers and plastics; (4) high-pressure liquid chromatographic (HPLC) separations of polar and moderately polar organics on conventional packed columns without the need for organic solvents and under conditions where a universal detector (flame ionization detector) as well as conventional HPLC detectors can be used; (5) preparative separations of organics on sorbent phases; (6) degradation of energetic materials (TNT, HMX, RDX, and the like); (7) degradation/dechlorination of chlorophenols; (8) degradation/dechlorination of PCBs; (9) degradation/dehalogenation of halogenated solvents; (10) removal of PAHs and pesticides (hydrophobic pollutants) from subcritical water by flocculation; (11) dehalogenation and degradation of chlorinated plastics; (12) degradation of non-chlorinated plastics; (13) removal of unwanted organic contaminants from plastics; (14) in-situ decontamination of soil and other bulk materials; and (15) production of food flavors from natural products by reaction in or with subcritical water.

Subcritical water has greatly enhanced abilities to dissolve organic compounds that have low solubilities in water in ambient conditions. Liquid water below 100° C., steam, and supercritical water (water at a temperature above 374° C. and at a pressure of greater than 218 atm) have all been used in a wide variety of commercial processes. However, the use of subcritical water (water in the range of 100° to 374° C.) has received very little attention for commercial uses. Analytical-scale extractions of organic pollutants from soils, sludges, and sediments have been demonstrated that exploit the reduced polarity (evidenced by a decrease in the dielectric constant of water) which can be achieved by subcritical water (described below). The present invention further exploits the enhanced mass transfer characteristics to extend the use of subcritical water to several processes with potential commercial applications. These enhanced mass transfer characteristics are based on lower viscosity at higher temperatures (e.g., at 200° C., which is ca. 1/10 of that at ambient conditions) and the lower surface tension at higher temperatures (e.g., at 250° C. which is ca. 1/3 of that at ambient conditions).

The use of water for the processes of the present invention has various practical benefits which include, but are not limited to, the following: (1) Water is environmentally benign, widely available, and very inexpensive. (2) Water is nonhazardous to workers and nonhazardous to the environment. (3) Water extraction applies to a broad range of solids and semisolids, both of a nonbiological (e.g., soil and waste sludges) and a biological nature (e.g., plant and animal tissue). Since water is used as the extraction fluid, it does not matter whether the matrix is wet or dry. In addition, residual solvent water left on the solid matrix causes no harm. For applications such as remediation, water extraction does not destroy soil productivity, unlike incineration or some solvent extraction processes. (4) Subcritical water is much less corrosive than either steam or supercritical water and requires much lower temperatures (only 100° to 374° C.) and pressures (only ambient to 218 atm) than supercritical water which requires temperatures above 374° C. and pressures above 218 atm. This greatly reduces the engineering costs and increases the safety associated with the processes. (5) Subcritical water can be used to extract nonpolar organics, polar organics, and metals, and selectively can be introduced by simply changing the extraction temperature. (6) Since radionuclides often exist as water-insoluble salts and oxides, it is possible to extract hazardous organics from mixed wastes without extracting radioactive species.

The processes of the present invention utilize several physiochemical phenomena which enhance the use of subcritical water for the removal of organic pollutants from solids, semisolids, and liquids.

Figure 4A:
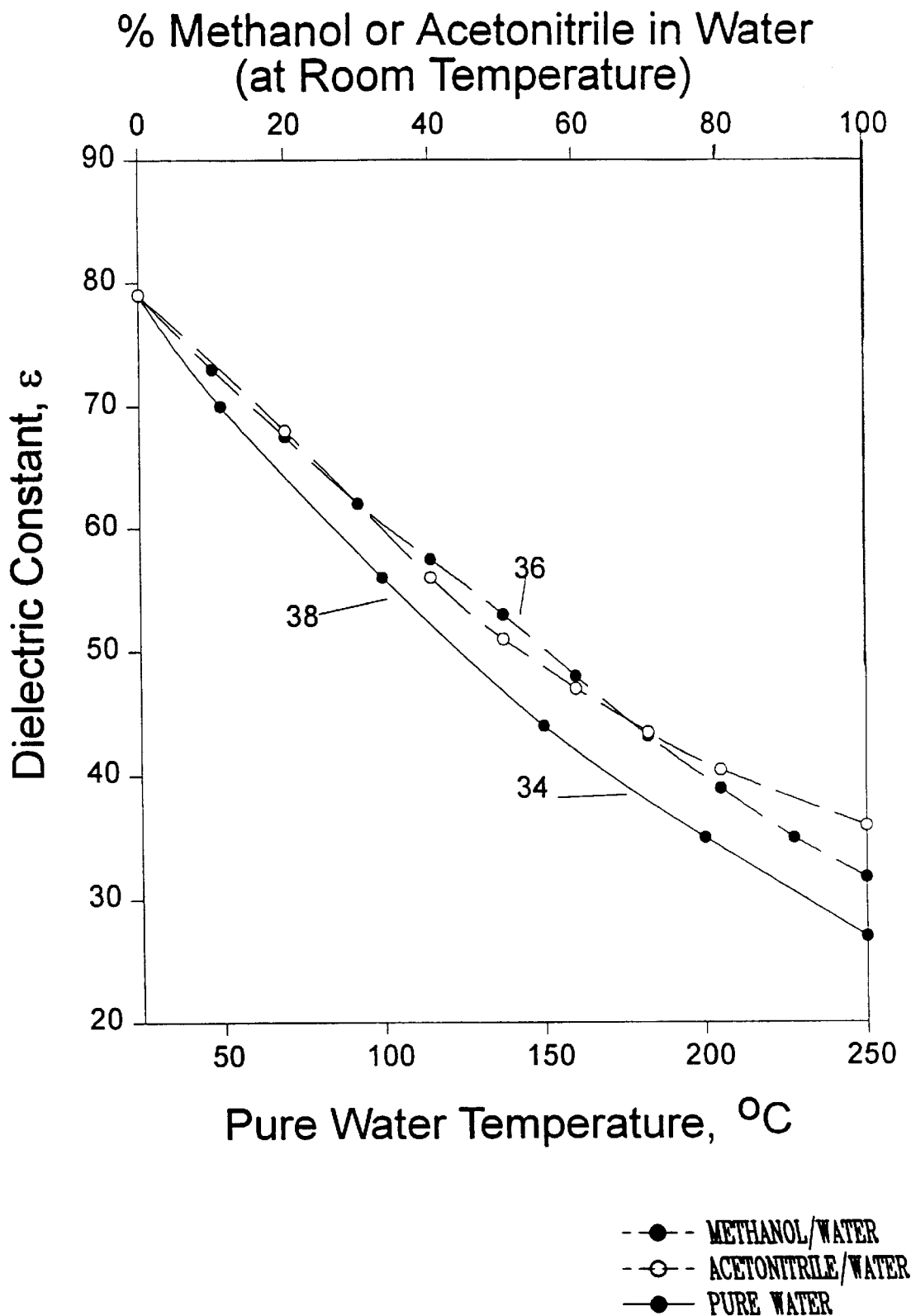
FIGS. 4A, 4B, and 4C compare the dielectric constant, viscosity, and surface tension of pure water, methanol/water mixtures, and acetonitrile/water mixtures.
Figure 4B:
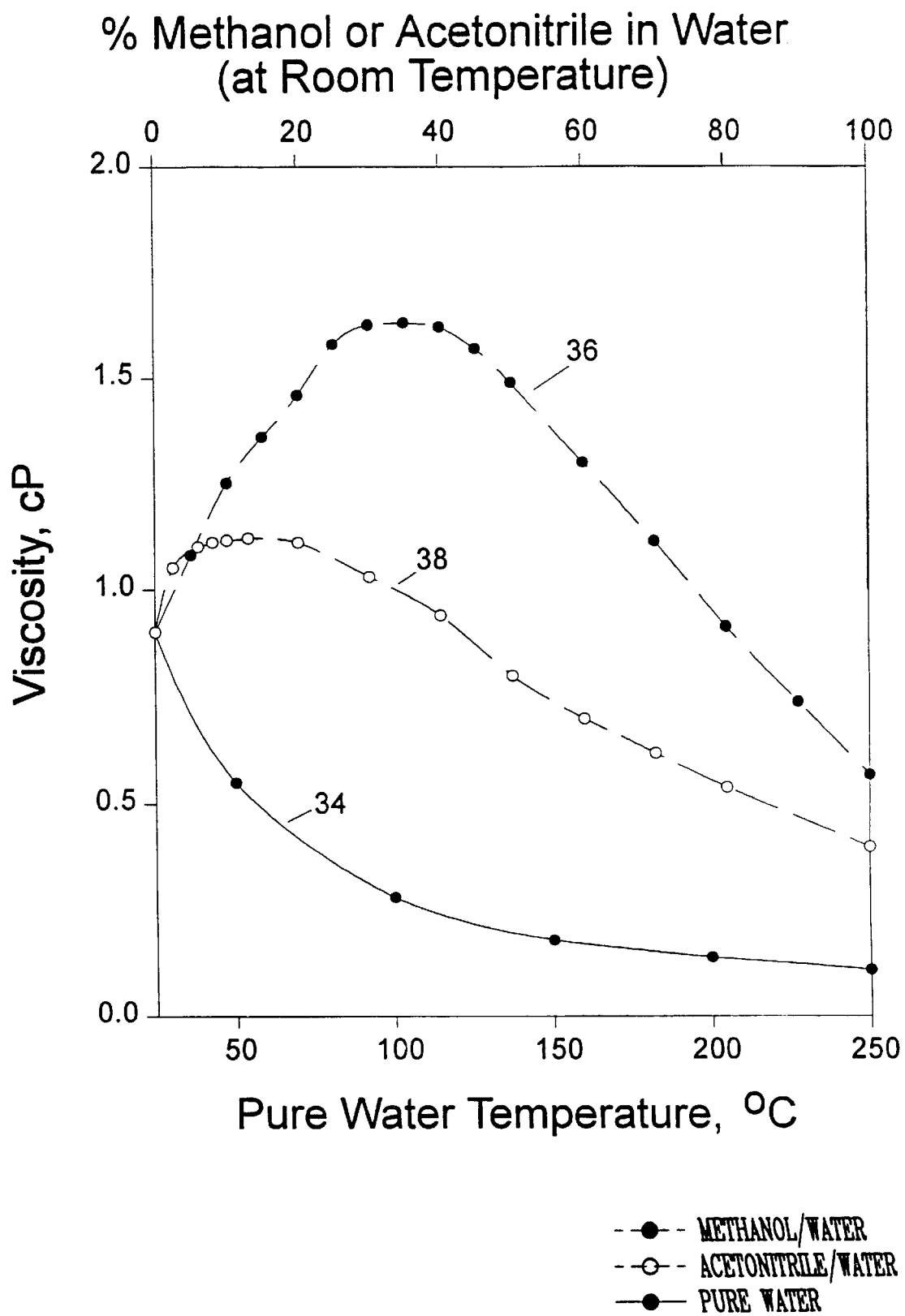
Figure 4C:
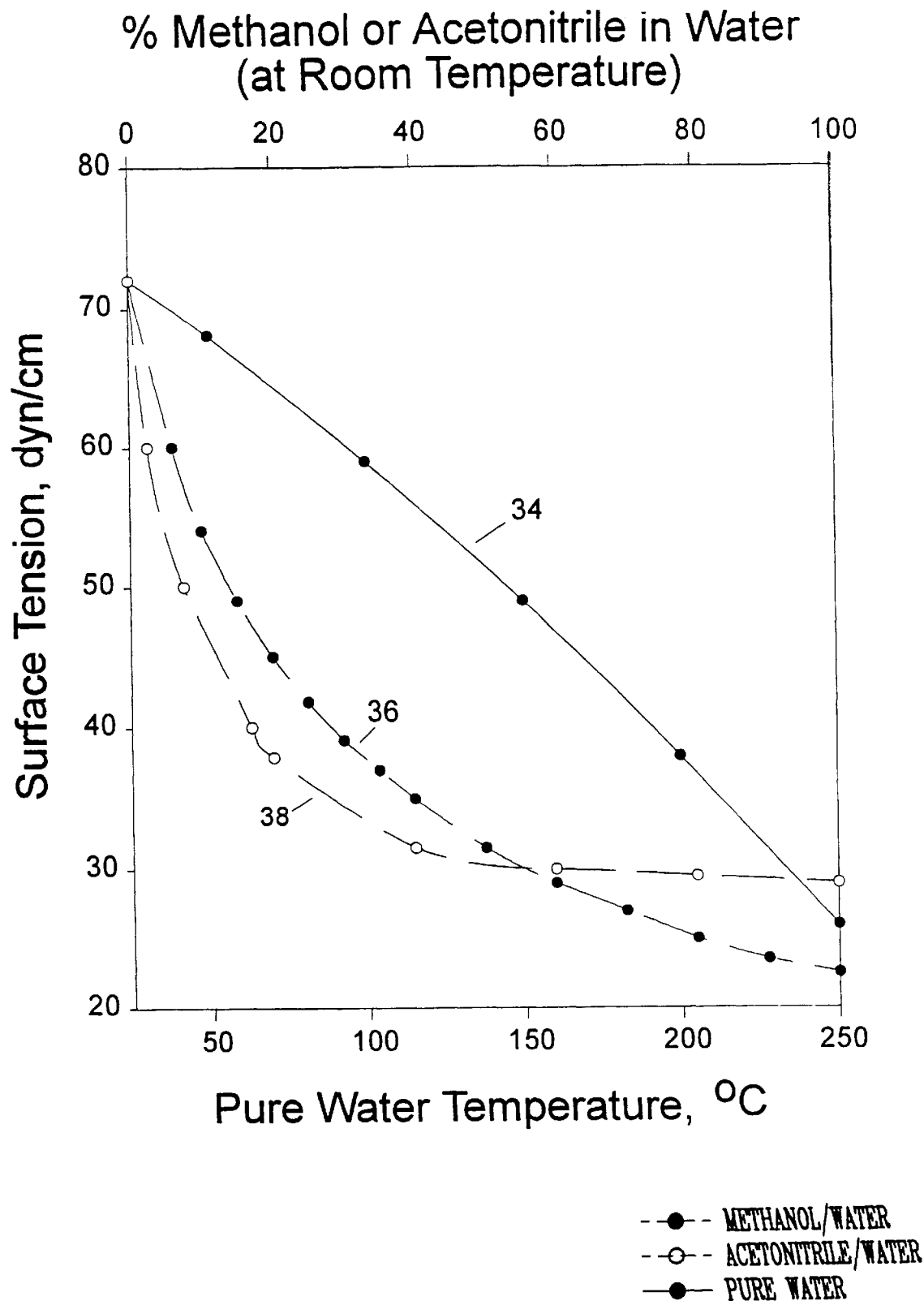

The polarity of water, as described by its dielectric constant, is reduced dramatically with raising temperature up to the critical temperature of water of 374° C. In order to maintain the liquid state of water, pressure is applied (e.g., between 1 and 50 atm for temperatures between 100° and 250° C.). Raising the temperature of the water makes the water behave increasingly like an organic solvent until the water's solvent properties are similar to common solvents such as methanol or acetonitrile. It has been observed that the solubility of common organic pollutants increases dramatically (ca. $10^5$-fold) in subcritical water over the solubilities of the same organics in water at ambient conditions. By controlling the water temperature in the liquid state, the solubility of organic compounds can be controlled over several orders of magnitude. FIGS. 4A, 4B, and 4C are charts which show how the polarity (dielectric constant), viscosity, and surface tension can be controlled by heating subcritical water, and compares these three parameters with the more common approach of mixing water with organic solvents at room temperature. First, FIGS. 4A–4C show the dielectric constant, viscosity, and surface tension, respectively, versus temperature for pure water 34. FIGS. 4A, 4B, and 4C also show the dielectric constant, viscosity, and surface tension, respectively, of a mixture of methanol or acetonitrile in water versus the percentage of the solvent in the mixture. As shown in FIG. 4A, the dielectric constant of pure water decreases dramatically as the temperature of the water increases. FIG. 4A also shows that the dielectric constant of the mixture of methanol/water 36 and acetonitrile/water 38 is higher than that of pure water at the temperatures and concentrations shown. As shown in FIG. 4B, the viscosity of pure water also decreases (well below the viscosity of methanol/water and acetonitrile/water at the concentrations shown) as the temperature of the water increases. As shown in FIG. 4C, the surface tension of pure water decreases dramatically as the temperature of the water increases, until it is below that of pure acetonitrile (100%) and nearly as low as pure methanol (100%).

As shown in FIG. 4B, increasing the water temperature while maintaining enough pressure to maintain the liquid state decreases the water's viscosity (for example, by ca. 10-fold at 250° C. versus its viscosity at room temperature). This decrease in viscosity yields better mass transfer and, therefore, enhances extraction rates. Access to small pores in the contaminated sample and in the activated carbon used to clean the extractant water is also enhanced (described below).

As shown in FIG. 4C, increasing the water temperature while maintaining enough pressure to maintain the liquid state, decreases the water's surface tension by ca. three-fold (at 250° C. versus room temperature). A decrease in surface tension yields better wetting of the surfaces of the contaminated samples. This results in faster extraction. Better wetting of the activated carbon used to clean the extractant water increases the rate of removal and quantities of pollutants that can be removed from the extracted water (described below). In addition, access to small pores in the contaminated sample and in the activated carbon used to clean the extracted water is also enhanced.

Unexpectedly, the effectiveness of the activated carbon increases with the use of subcritical water. Under conventional theory, an activated carbon filter should be much less effective under high temperatures since the solubility of a compound is inversely proportional to the effectiveness of the carbon filter. However, the effectiveness of a carbon filter increases with the use of subcritical water—exactly opposite of what would be expected.

The pressure used for extraction has no significant effect on the removal rates and efficiencies of organic compounds from solid, semisolid, and liquids, as has previously been demonstrated for analytical scale extraction of organic compounds. Therefore, the process only requires enough pressure to maintain the water in the liquid state.

EXAMPLES

Example 1

Control of the Solubility of Organic Compounds

The solubility of organic compounds can be controlled by controlling the temperature of heated water (subcritical water) held in the liquid state by the application of pressure. The solubility of organic compounds can be controlled in subcritical water over several orders of magnitude. This ability, along with the enhanced mass transfer (resulting from lower viscosity and lower surface tension), provides the basis for using subcritical water for the processes described below. Table 1 illustrates the ability to control the solubility of organic compounds.

TABLE 1

The solubility of anthracene and chlorothalonil at various temperatures.

| Water Temperature | Solubility (mg/L) | |
|---|---|---|
| (°C.) | Anthracene | Chlorothalonil |
| 25 | 0.08 | 0.2 |
| 50 | 0.2 | 0.8 |
| 100 | 2.9 | 28 |
| 150 | 91 | 950 |
| 200 | 2050 | 23,400 |

As shown, the solubility dramatically increases as the water temperature increases. Similar abilities to control solubilities have been demonstrated for benzo[a]pyrene and the pesticides propazine and endosulfan II, for example.

Example 2

Removal of Hazardous Organics from Solids or Semisolids

Hazardous organics can be removed from waste sludges. Examples include the selective removal of phenols and PAHs (polycyclic aromatic hydrocarbons) at 150° to 250° C. Less than one percent removal of total nonhazardous organic components (e.g., alkanes and other nonhazardous sludge matrix components) yielding ca. 1:100 reduction and hazardous waste volume are possible. Table 2 illustrates data for the effect of water temperature on selective extractions of organics from petroleum waste sludge determined by a sequential extraction at 50 atm for ten minutes at each temperature.

TABLE 2

Effect of water temperature on organic removal.

| | Concentration[a] | Cumulative Percent Removal[b] for liquid water at: | | |
|---|---|---|---|---|
| Organic | (µg/g) ± SD | 150° C. | 200° C. | 250° C. |
| Phenol | 1313 ± 146 | 99 | 100 | 100 |
| o-cresol | 1016 ± 132 | 97 | 100 | 100 |
| m,p-cresol | 2358 ± 256 | 98 | 100 | 100 |
| $C_2$-alkylphenol | 748 ± 91 | 93 | 97 | 100 |
| Naphthalene | 1007 ± 20 | 95 | 99 | 100 |
| Phenanthrene | 20 ± 1.3 | 25 | 75 | 97 |
| Pyrene | 0.81 ± 0.025 | 5 | 46 | 93 |
| $C_{11}$ | 669 ± 91 | 2 | 6 | 58 |
| $C_{12}$ | 704 ± 92 | —[c] | 3 | 38 |
| $C_{13}$ | 766 ± 79 | — | 2 | 36 |
| $C_{14}$ | 684 ± 75 | — | — | 23 |
| $C_{15}$ | 603 ± 64 | — | — | 18 |
| $C_{16}$ | 381 ± 65 | — | — | 13 |
| $C_{17}$ | 332 ± 52 | — | — | 14 |
| $C_{18}$ | 127 ± 16 | — | — | 9 |
| $C_{19}$ | 70 ± 7.9 | — | — | 9 |
| $C_{20}$ | 41 ± 5.7 | — | — | 8 |
| $C_{21}$ | 23 ± 5.3 | — | — | 7 |
| $C_{22}$ | 16 ± 0.85 | — | — | — |
| $C_{23}$ | 17 ± 1.8 | — | — | — |
| $C_{24}$ | 25 ± 3.2 | — | — | — |
| $C_{25}$ | 41 ± 5.0 | — | — | — |
| $C_{26}$ | 54 ± 6.4 | — | — | — |
| $C_{27}$ | 58 ± 6.5 | — | — | — |
| $C_{28}$ | 52 ± 5.4 | — | — | — |
| $C_{29}$ | 47 ± 4.6 | — | — | — |
| $C_{30}$ | 34 ± 2.9 | — | — | — |
| $C_{31}$ | 25 ± 1.9 | — | — | — |
| $C_{32}$ | 15 ± 0.93 | — | — | — |
| $C_{33}$ | 9.0 ± 0.54 | — | — | — |

[a]Values were obtained by 16-hour sonication extractions of triplicate fresh samples using methylene chloride and acetone.
[b]100% removal is defined by the lack of any detectable species in the 16-hour sonication extract of the residues after 60-minute water extraction.
[c]Not detected in this fraction.

Example 3

Removal of Pesticides from Contaminated Soil

The process of the present invention can be used for the removal of pesticides from contaminated soil. Table 3 demonstrates the removal of pesticides from contaminated soil in 15 minutes with subcritical water at 250° C.

TABLE 3

The approximate concentrations of various pesticides before and after their removal with 250° C. water.

| | Approximate concentration (mg/kg) | |
|---|---|---|
| Pesticide | Before cleanup | After cleanup |
| Alachlor | 210 | ND[a] |
| Atrazine | 190 | ND |

TABLE 3-continued

The approximate concentrations of various
pesticides before and after their removal with 250° C. water.

| Pesticide | Approximate concentration (mg/kg) | |
| --- | --- | --- |
| | Before cleanup | After cleanup |
| Cyanazine | 110 | ND |
| EPTC | 530 | ND |
| Metolachlor | 120 | ND |
| Pendimethalin | 460 | ND |
| Trifluralin | 110 | ND |

[a]not detected. Estimated detection limits correspond to >99.9% removal.

As shown, a complete removal (greater than 99.9%) of polar and nonpolar pesticides from highly contaminated soil in 15 minutes is possible. Table 4 illustrates the removal of the same pesticides from contaminated soil in 15 minutes with subcritical water at temperatures below 250° C.

TABLE 4

The approximate concentrations of various
pesticides before and after their removal with <250° C. water.

| Pesticide | Approximate conc. before cleanup (mg/kg) | % pesticides removed in 15 min. at: | |
| --- | --- | --- | --- |
| | | 150° C. | 200° C. |
| Alachlor | 210 | 96 | 99 |
| Atrazine | 190 | >99[a] | >99 |
| Cyanazine | 110 | >99 | >99 |
| EPTC | 530 | >99 | >99 |
| Metolachlor | 120 | >99 | >99 |
| Pendimethalin | 460 | 96 | >99 |
| Trifluralin | 110 | 80 | >99 |

[a]Compounds listed as >99% removed were not detected in the soil after water extraction. Estimated detection limits correspond to >99% removal.

As shown, the complete removal of many pesticides and nearly complete removal of the remaining pesticides are possible at lower temperatures in the range of 150° to 200° C.

Table 5 illustrates the removal of mercury from contaminated soil with subcritical water.

TABLE 5

Examples of three soil samples with differing
initial concentrations and the percentage of mercury removed
for various temperatures and for various amounts of
extraction time.

| | Soil A | Soil B | Soil C |
| --- | --- | --- | --- |
| Initial conc. (mg/kg) | 213 | 3380 | 50 |
| Conditions | % Mercury removed: | | |
| 15 min., 250° C. | 71 | 35 | 87 |
| 30 min., 250° C. | 95 | 45 | — |
| 30 min., 300° C. | — | 84 | 93 |

Example 4

Extraction of Organic Compounds from Solids and Semisolids

The process may be used to extract organic compounds from solids and semisolids which allows for the purification and continuous reuse of the extractant water. The process also allows for the concentration of extracted organics into a solid phase cartridge. Clean up of the contaminated (extractant) water is achieved by passing the water through activated carbon or some other sorbent material (described in detail below). For example, activated carbon can be placed in a cartridge which receives a flow of extractant water after the sample extraction in order to absorb the extracted organic compounds from the extractant water. This type of process does not require any cooling of the extractant water. This process also allows continuous recycling of the extractant water which, therefore, reduces the quantity of water required. This process also operates at the extractant temperature, reducing the heating requirements for the process since only the solid or semisolid sample needs to be heated after the initial heating of the extractant water. Following are examples of complete (>99.9%) removal of extracted organics from the extractant water using activated carbon placed such that the water flows through the activated carbon after extracting the sample.

Pesticides

Figure 5B:
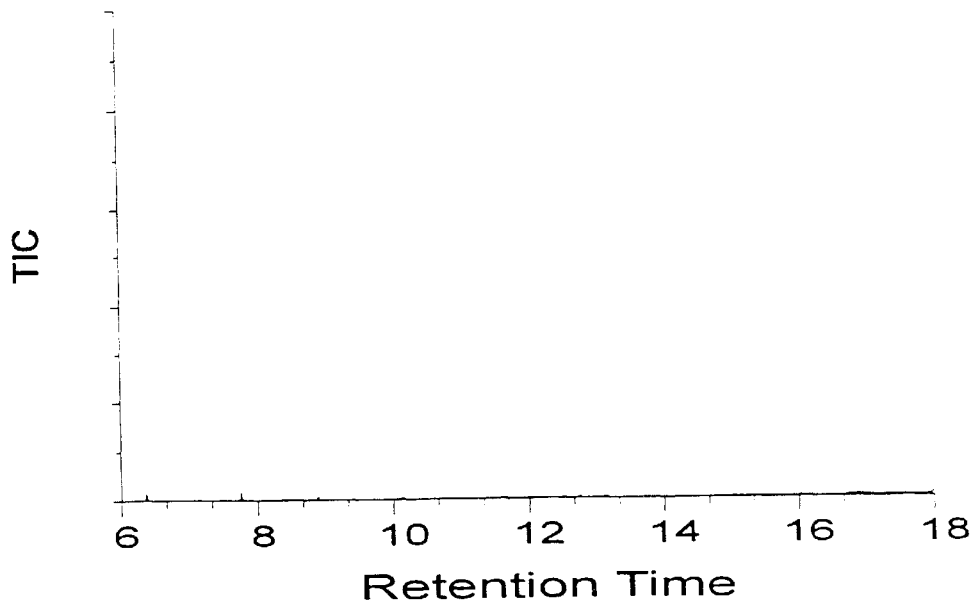
FIGS. 5A and 5B are plots of gas chromatography/mass spectrometry analyses of pesticides extracted from highly contaminated soil before (FIG. 5A) and after (FIG. 5B) treatment of the subcritical extractant water with hot activated carbon.
Figure 5A:
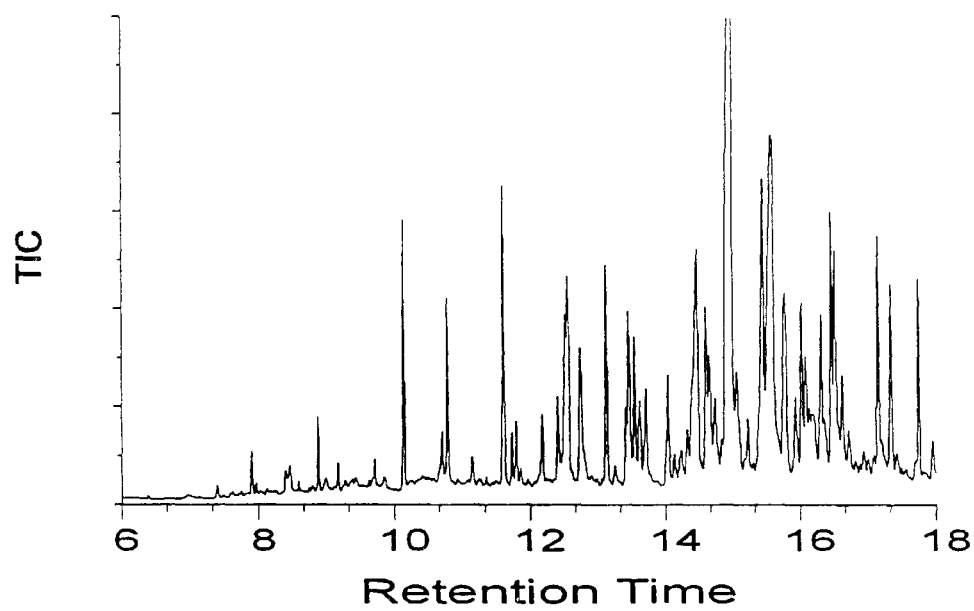

First, the removal of pesticides from highly contaminated (several hundred parts per million (ppm) of individual pesticides) soil is achieved. As shown in Table 3, the water extraction at 250° C. removes virtually all detectable pesticides from the soil. The extractant water can be cleaned simultaneously by passing the water through an activated carbon cartridge (also at 250° C.) placed directly after the soil sample. No pesticides were detected in the effluent water, indicating at least 99.9% clean up of the effluent water as demonstrated in FIG. 5B. FIGS. 5A and 5B are plots of a gas chromatography/mass spectrometry analysis of pesticides extracted from highly contaminated soil. The chromatogram in FIG. 5A shows the pesticides found in the extracted water when no activated carbon was used. The chromatogram in FIG. 5B shows the absence of any detectable pesticides when a duplicate sample was extracted with an activated carbon sorbent placed such that the extractant water passes through the carbon after the pesticides were extracted from the soil.

Experiments have demonstrated a volume waste reduction of more than 100 to 1 (the weight of the soil extracted compared to the weight of activated carbon used to clean the extractant water) for soil contaminated with several hundred ppm of pesticides. The actual volume of waste reduction is likely to be greater than 100 to 1 for the sample. The ability of the sorbent to clean extracted water at a ratio of at least 1000 to 1 (the weight of water to the weight of activated carbon) is also possible. Experiments demonstrate soils contaminated at lower concentrations require proportionally lower amounts of activated carbon to clean the extractant water.

PAHs

Figure 6B:
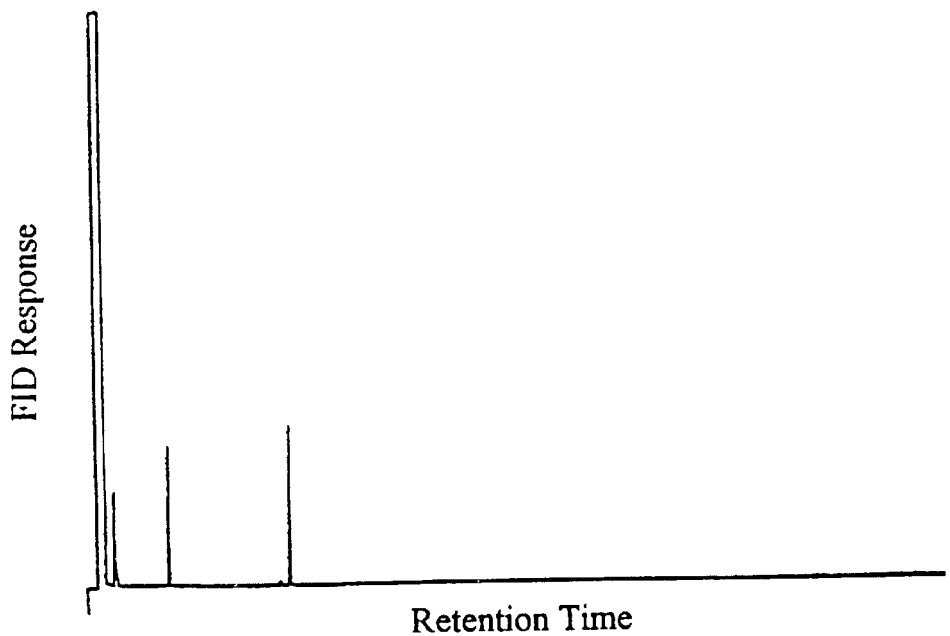
FIGS. 6A and 6B are gas chromatography/flame ionization detection (FID) analyses of coal tar PAHs extracted from highly contaminated soil before (FIG. 6A) and after (FIG. 6B) treatment of the subcritical extractant water with hot activated carbon.
Figure 6A:
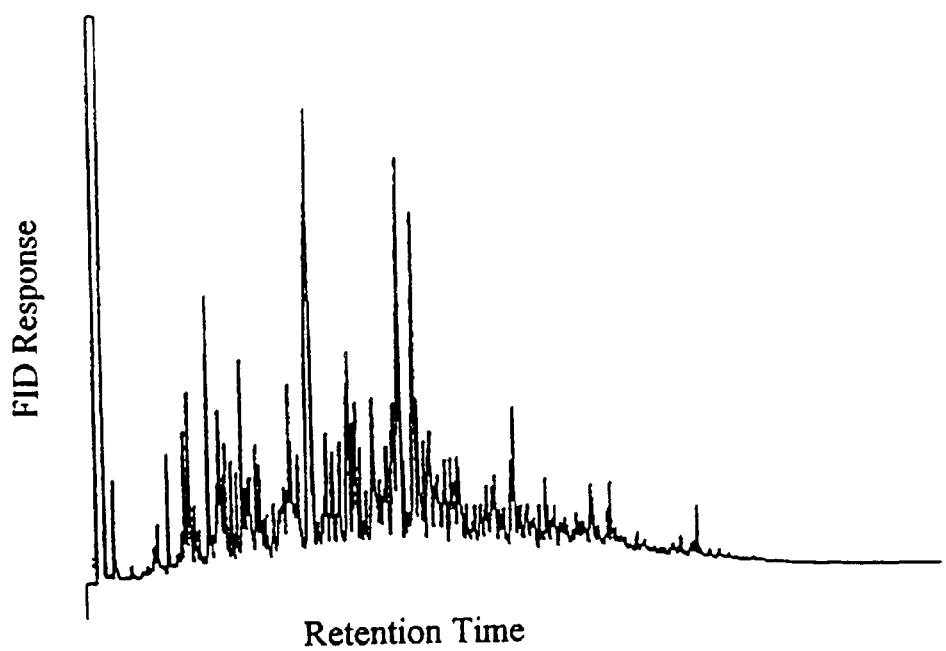

Another example of the removal of extracted organics from extractant water using activated carbon is the removal of PAHs (coal tar) from a highly contaminated (several hundred ppm of individual PAHs) soil. The water extraction at 250° C. removes all (>99.9%) detectable PAHs from the soil. The extractant water can be cleaned simultaneously by passing the water through an activated carbon cartridge which is also held at 250° C. No PAHs will be detected in the effluent water, indicating at least 99.9% clean up of the effluent water as demonstrated in FIGS. 6A and 6B. FIGS. 6A and 6B are gas chromatography/flame ionization detection (FID) analyses of coal tar PAHs extracted from highly contaminated soil. The chromatogram in FIG. 6A shows the PAHs found in the extractant water when no activated carbon is used. The chromatogram in FIG. 6B shows the absence of any detectable PAHs when a duplicate sample is extracted with an activated carbon sorbent placed so that the extractant water passes through the carbon after the PAHs are extracted from the soil. The peaks shown in the bottom chromatogram are internal standards added to the extractant to allow a quantitative analysis. Identities of the PAHs can be confirmed using gas chromatography/mass spectrometry analysis. Note that the source of PAHs can be of any nature including, but not limited to, coal tar, wood treatment processes, creosote, petroleum, and town gas production.

PCBs

Figure 7B:
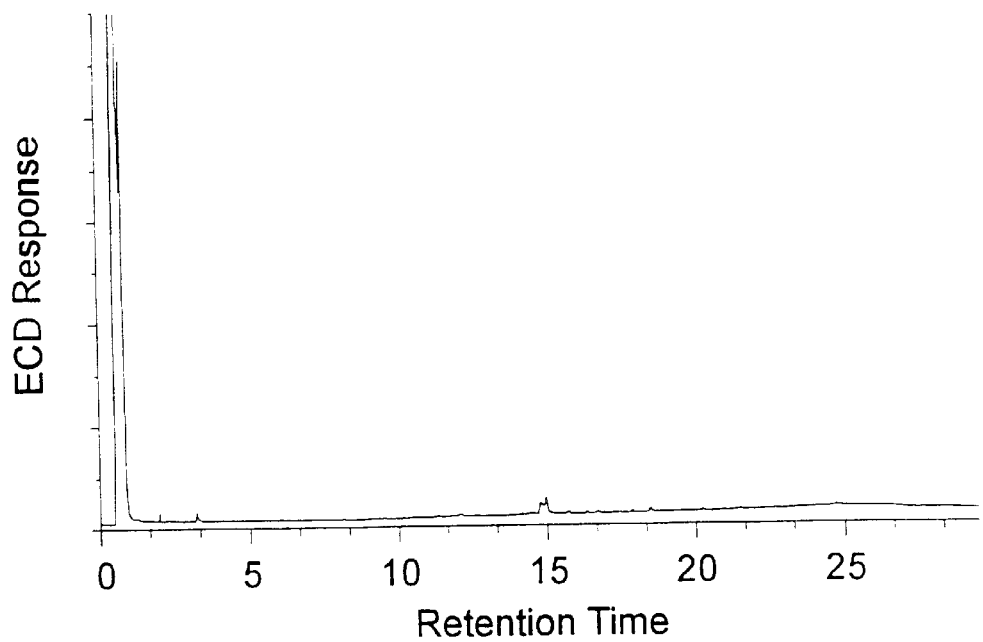
FIGS. 7A and 7B are gas chromatography/electron capture detection analyses of PCBs extracted from highly contaminated soil before (FIG. 7A) and after (FIG. 7B) treatment of the subcritical extractant water with hot activated carbon.
Figure 7A:
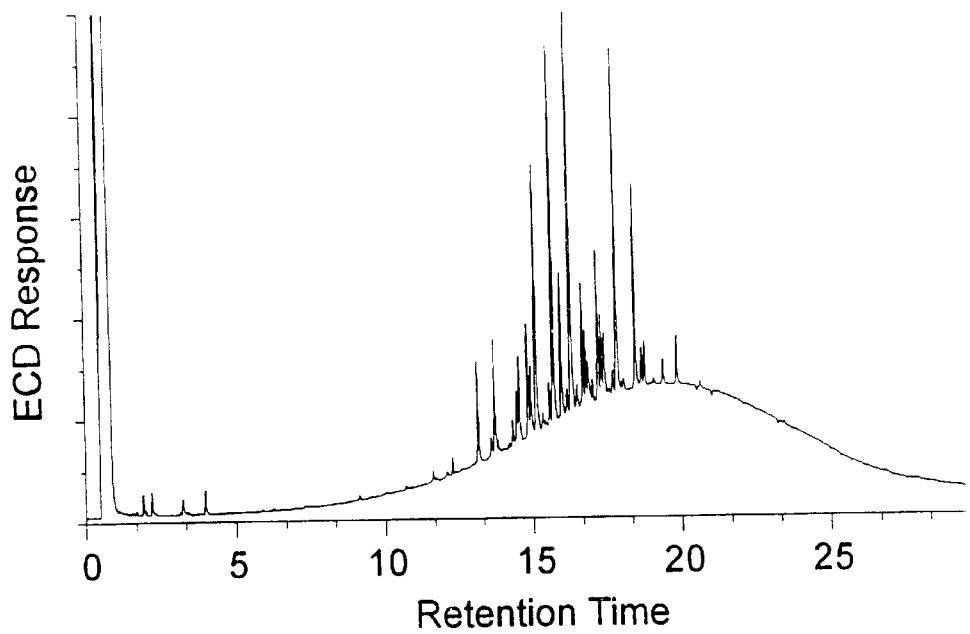

Another example of the removal of extracted organics from extractant water using activated carbon is the removal of PCBs (polychlorinated biphenyls) from a contaminated (ca. 500 mg/kg of total PCBs) soil. The water extraction at 250° C. removes all (greater than 99%) detectable PCBs from the soil. The extractant water can be cleaned simultaneously by passing the water through an activated carbon cartridge (also at 250° C). No PCBs will be detected in the effluent water, indicating that at least 99.9% of the effluent water is cleaned, as demonstrated in FIGS. 7A and 7B. FIGS. 7A and 7B are gas chromatography/electron capture detection analyses of PCBs extracted from highly contaminated soil. The chromatogram in FIG. 7A shows the PCBs found in the extractant water when no activated carbon is used. The chromatogram in FIG. 7B shows the absence of any detectable PCBs when a duplicate sample is extracted with an activated carbon sorbent placed so that the extractant water passes through the carbon after extracting the PCBs from soil. Identities of the PCBs can be confirmed using gas chromatography/mass spectrometry analysis.

Destruction of Pesticides

A specific example of the enhanced reactions of organics using subcritical water is the destruction of pesticides from contaminated soil. In this example, the manipulation of the disassociation constant of water is used to achieve enhanced reactions. While this example could be accomplished using a pump to maintain sufficient pressure (see FIGS. 1 and 2), a more effective result is obtained using steam/water equilibrium as illustrated in FIG. 3 (described above) to maintain sufficient pressure. In this way, the contaminated soil could be placed in the reactor with water, sealed with sufficient headspace, heated, and then cooled. Table 6 shows the degradation of pesticides in contaminated soil using subcritical water.

TABLE 6

Initial concentrations of various pesticides and the percentage of the pesticide degraded after 30 minutes at 200° C. and 250° C. temperatures.

| Pesticide | Conc. before cleanup (mg/kg) | % pesticide degraded 200° C., 30 min. | % pesticide degraded 250° C., 30 min. |
|---|---|---|---|
| Alachlor | 210 | 92 | >98 |
| Atrazine | 190 | 75 | >98 |
| Cyanazine | 110 | 97 | >98 |
| Metolachlor | 120 | 97 | >98 |
| Pendimethalin | 460 | >98 | >98 |
| Trifluralin | 110 | 96 | >98 |

Example 5

Extraction of Synthesis Contaminants from Polymers or Plastics

Figure 8:
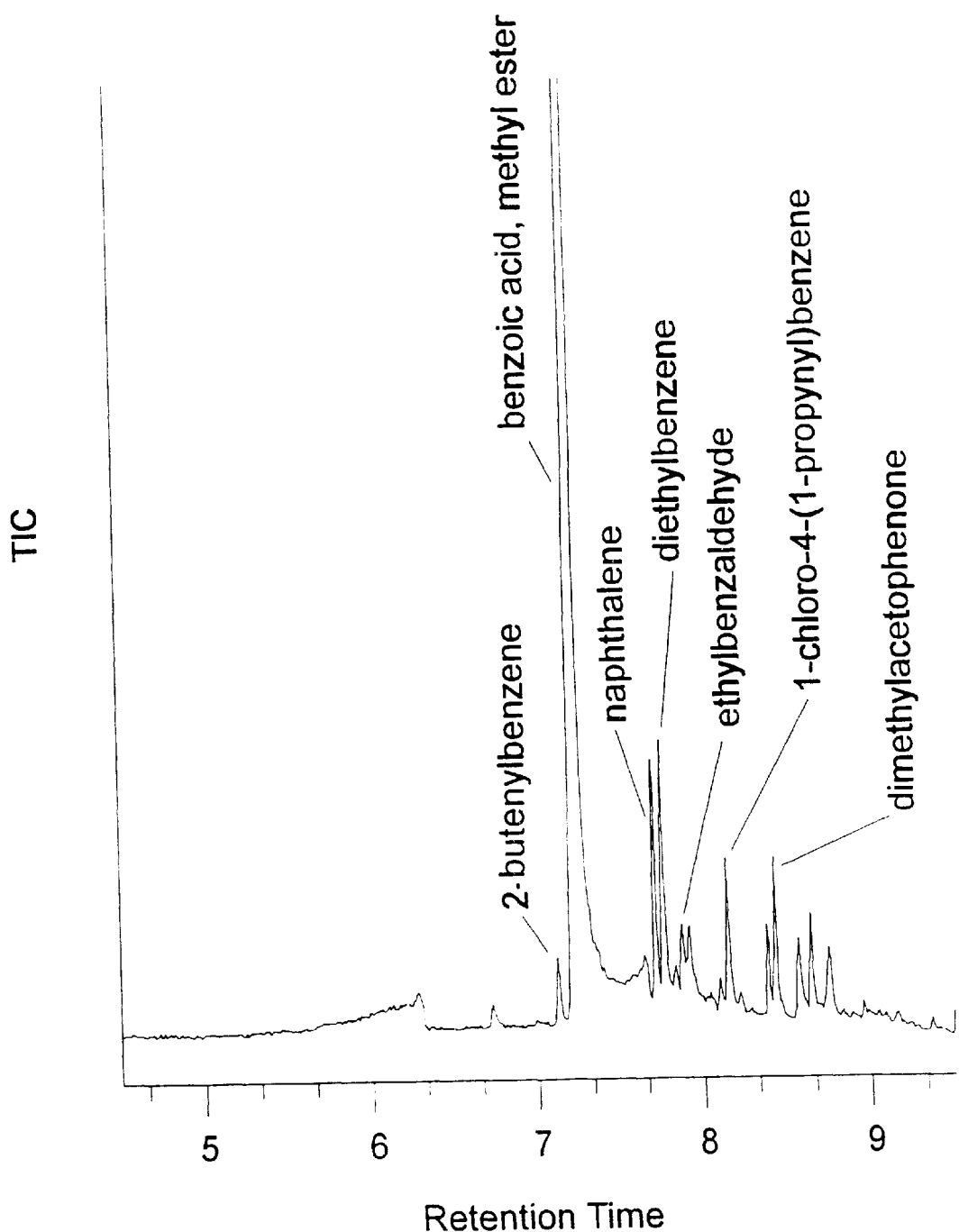
FIG. 8 shows a gas chromatography/mass spectrometry analysis of synthesis contaminants extracted from a polymer with subcritical water.

The extraction of synthesis contaminants from polymers or plastics is achieved with subcritical water. The use of subcritical water at 200° C. to remove contaminants from a styrene divinylbenzene copolymer is demonstrated in FIG. 8. FIG. 8 shows a gas chromatography/mass spectrometry analysis of synthesis contaminants extracted with subcritical water from a styrene divinylbenzene copolymer. The process does not change the physical state of the polymer. In addition, much lower temperatures can be used (e.g., 100° C. to 150° C.) to extract lower molecular weight (e.g., benzene) and more polar (e.g., phenol) contaminants.

Example 6

Extraction of Biologically Active Organic Compounds from Plant Tissue

Figure 9B:
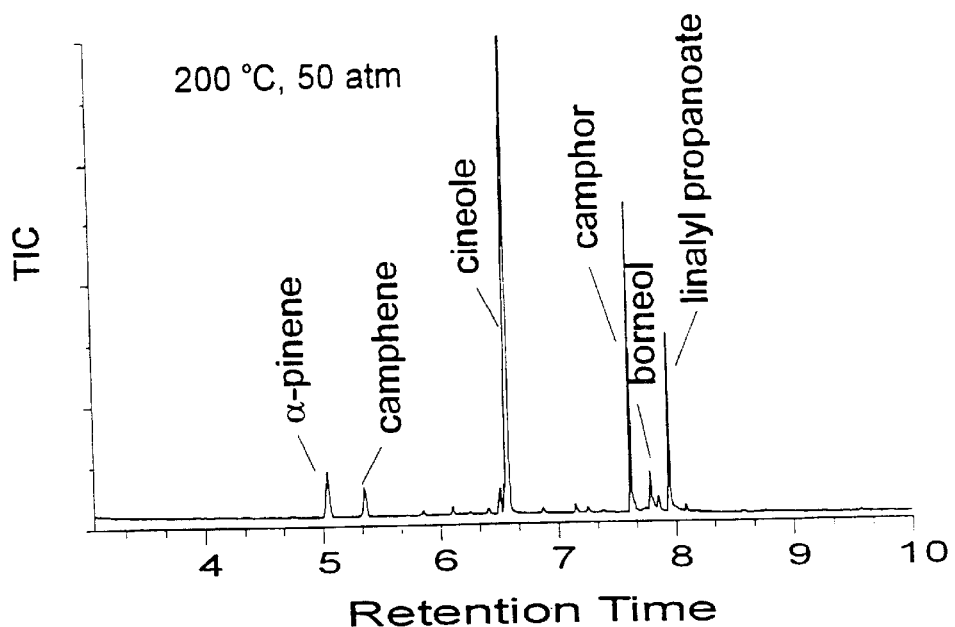
FIGS. 9A and 9B show gas chromatography/mass spectrometry analyses of biologically active organic compounds extracted with subcritical water from rosemary.
Figure 9A:
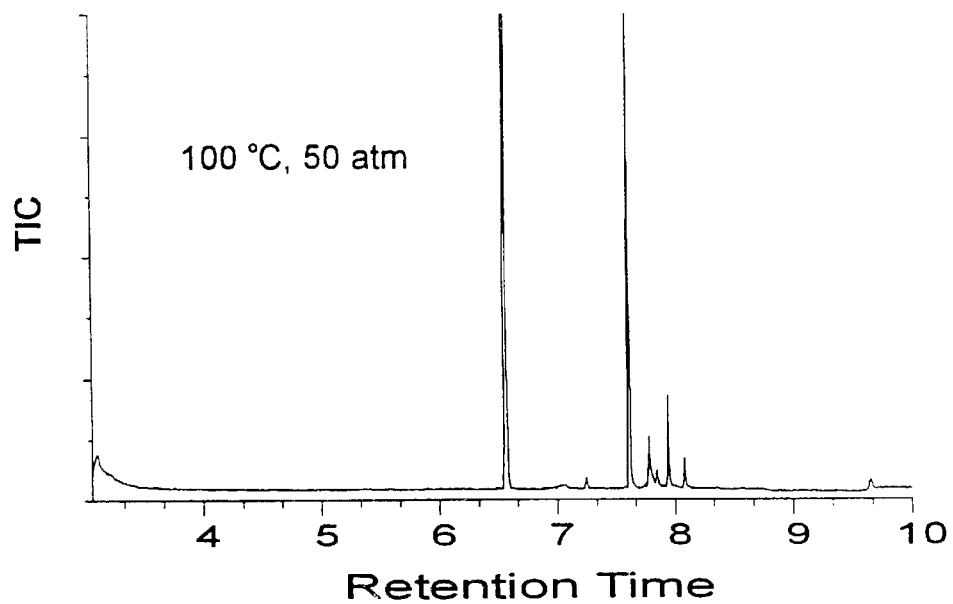

The extraction of biologically active organic compounds from plant tissue is achieved with subcritical water. The use of subcritical water at 100° C. and 200° C. to selectively extract flavor and fragrance compounds from rosemary is demonstrated in FIGS. 9A and 9B. FIGS. 9A and 9B show gas chromatography/mass spectrometry analyses of biologically active organic compounds extracted with subcritical water from rosemary. The chromatogram in FIG. 9A shows the organics extracted at 100° C., and the chromatogram in FIG. 9B shows the organics extracted at 200° C. Note that nonpolar monoterpenes are only found in the 200° C. extract. Other polar organics (such as borneol, cineole, camphor, and linalyl propanoape) extract at 100° C. while the less polar organics, such as alpha-pinene and camphene (both mono-terpenes), extract at 200° C., thus demonstrating the ability to selectively extract different compound classes of the biologically active organics. Such separations are potentially valuable for the food, pharmaceutical, and perfume industries.

Example 7

Subcritical Water as a Mobile Phase for High Pressure Liquid Chromatographic Separations The use of subcritical water as a mobile phase for high pressure liquid chromatographic separations is achieved. This allows reverse-phase separations without the addition of an organic mobile phase. This also allows the use of a conventional gas chromatographic flame ionization detector (FID) with water flows up to 200 μL/minute with conventional packed liquid chromatographic (LC) columns. This is the first known demonstration of a truly universal and sensitive chromatographic/detection system for reverse-phase HPLC.

Figure 10B:
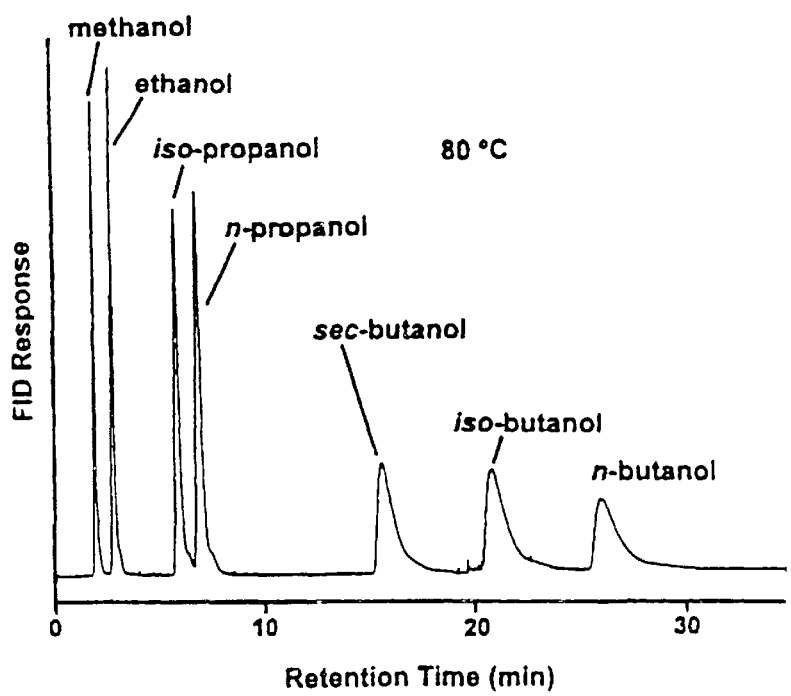
FIGS. 10A–10D illustrate reverse-phase separation of alcohols using pure subcritical water as the mobile phase.
Figure 10A:
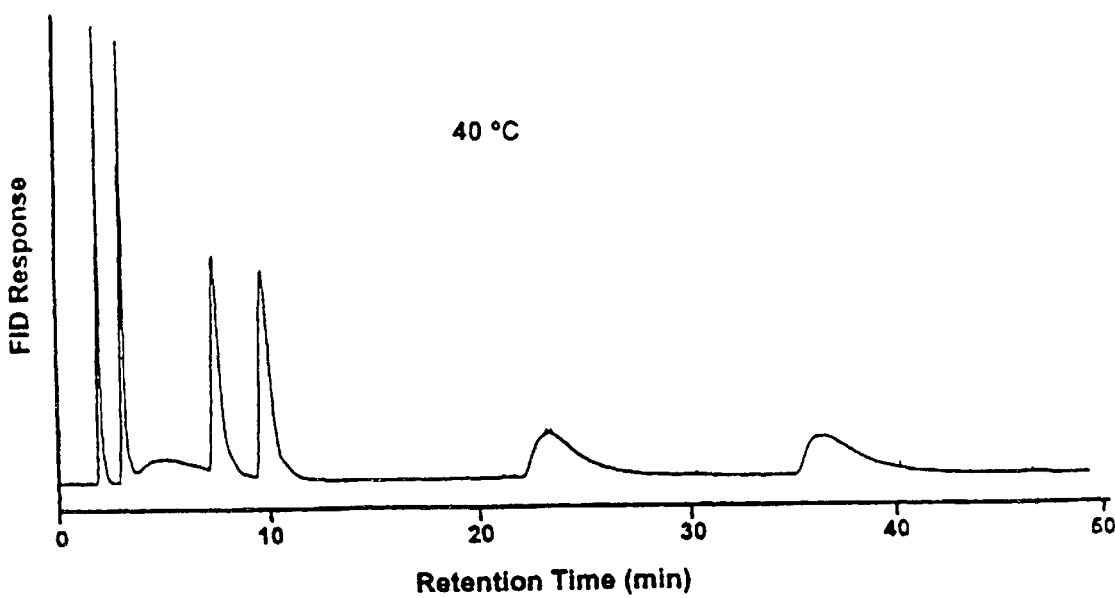
Figure 10D:
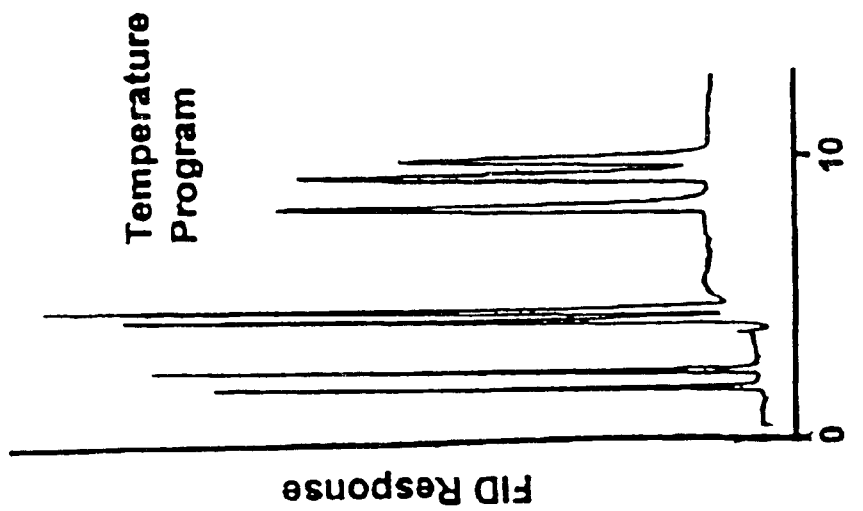
Figure 10C:
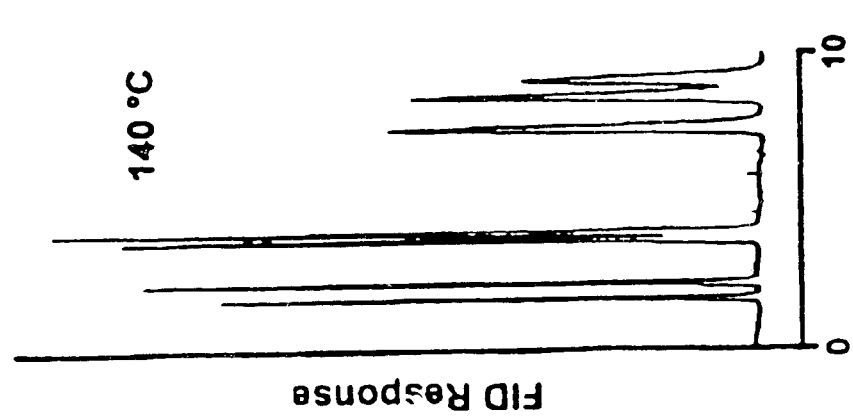
Figure 11:
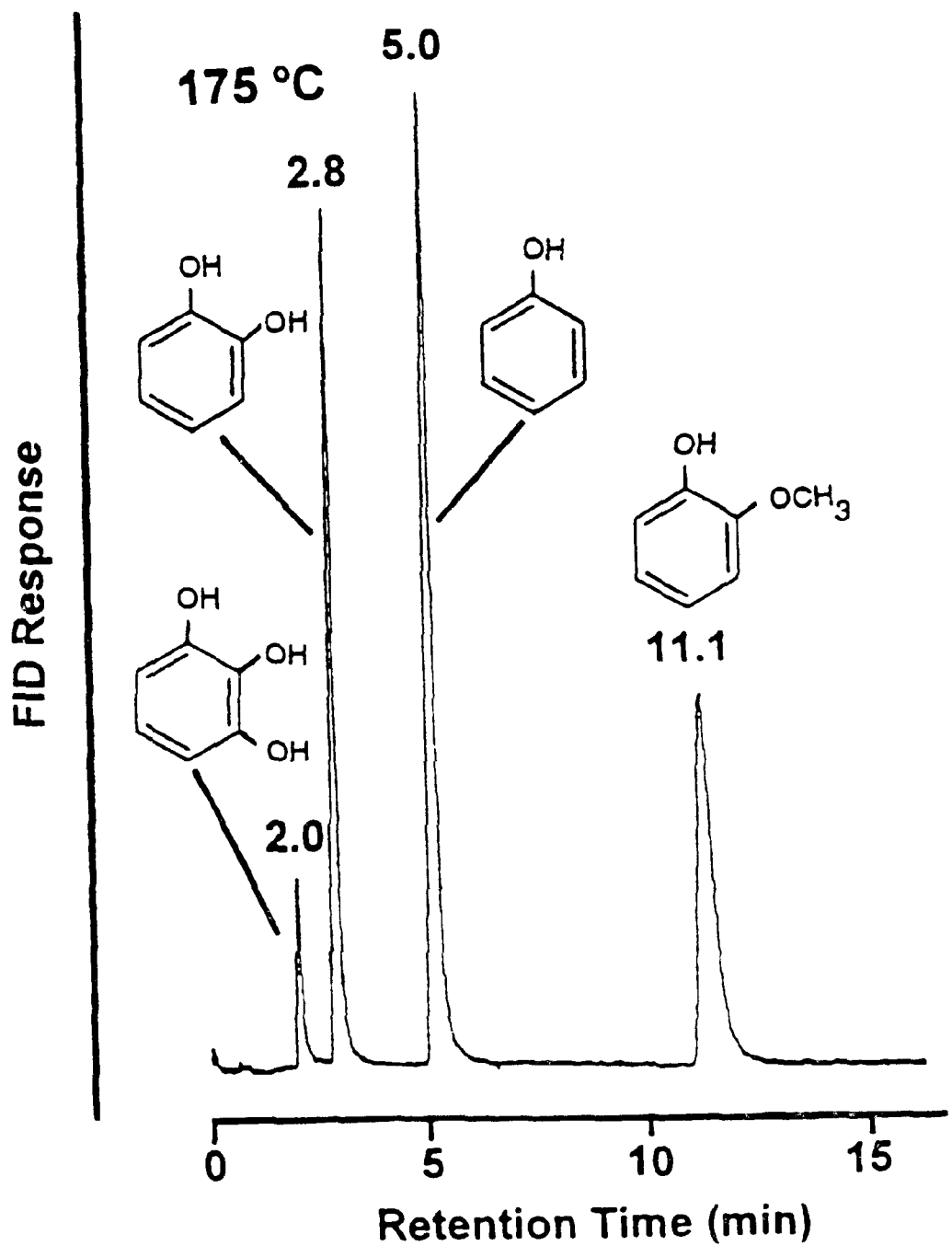
Figure 12A:
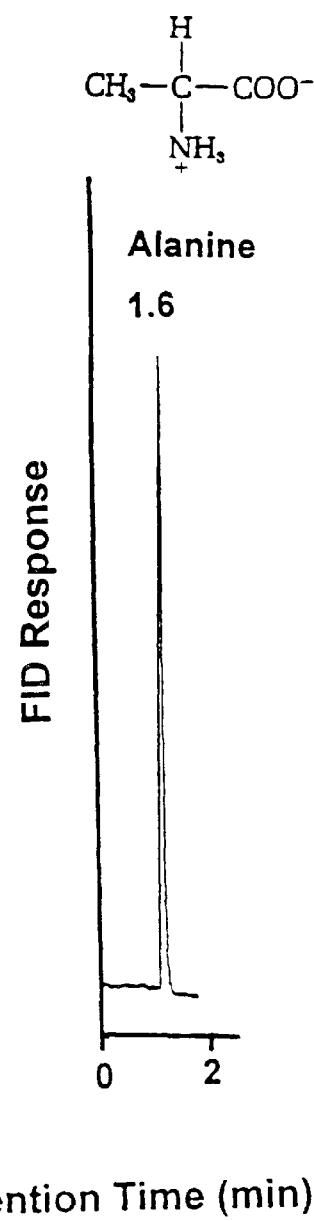
Figure 12C:
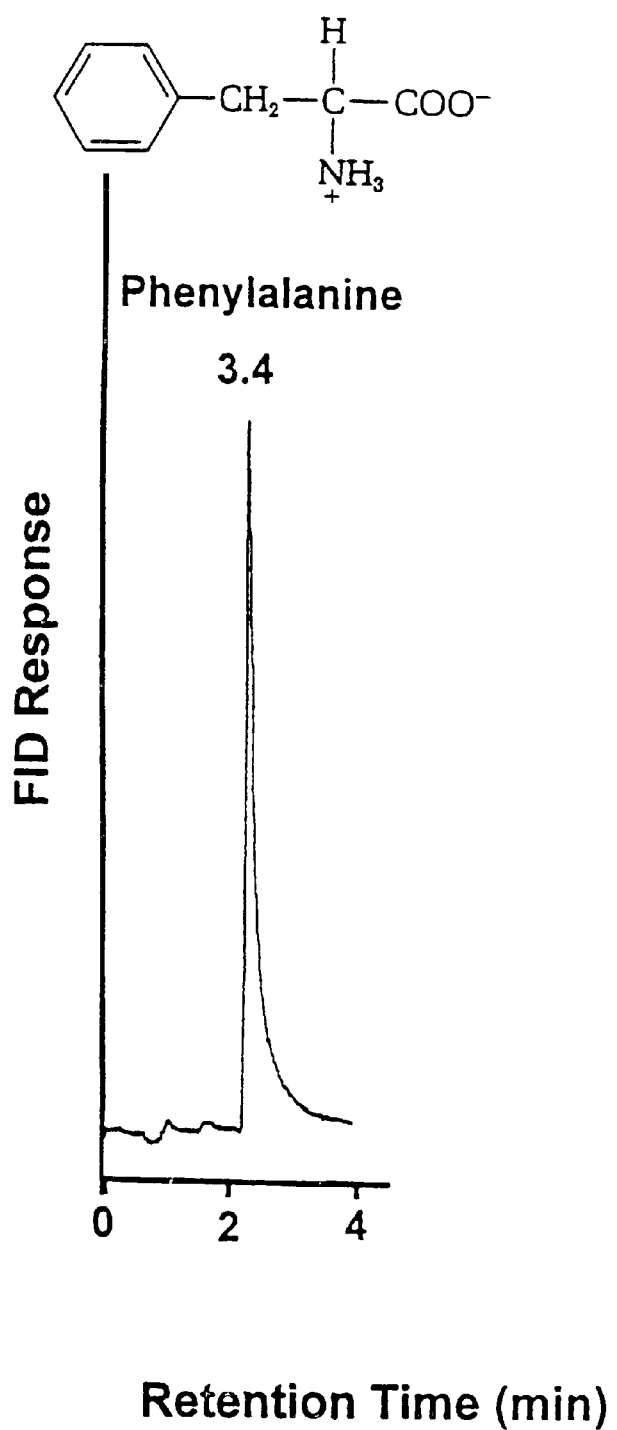

The ability to use increasing water temperature to enhance chromatographic separations which normally require the addition of organic solvents (which make the use of the FID detector impossible) is shown in FIGS. 10A, 10B, 10C, and 10D for the separation of alcohols. FIGS. 10A–10D illustrate reverse-phase separation of alcohols using pure water as the mobile phase and FID. The water temperature used is shown on the individual chromatograms of FIG. 10. The temperature program (FIG. 10D) was 120° C. (held for three minutes) followed by a temperature ramp of 15° C. per minute to 150° C. and held for ten minutes. Note that the larger alcohols (e.g., n-butanol) could not be eluted at 40° C. (FIG. 10A), while all alcohols were eluted rapidly with high resolution at 140° C. (FIG. 10C) or by performing temperature programming, as shown in FIG. 10D.

Note that the use of temperature programming to enhance HPLC elution and resolution is based on the change in water polarity achieved by increasing the temperature while maintaining the liquid state. Thus, temperature can be used in the same manner as the conventional HPLC technique of adding organic solvents. For example, increasing the water temperature to ca. 250° C. causes the same change in solvent polarity (based on the dielectric constant) as mixing methanol with the water to a methanol concentration of 100%. Thus, it is expected that temperature programming with pure water will achieve the same separations as presently performed by programmed mixing of methanol with water up to 100% methanol, as demonstrated in FIGS. 10A–10D (described above). Similarly, heating water to ca. 200° C. causes the same change in solvent polarity as mixing acetonitrile up to concentrations of 100%.

The use of FID allows universal detection of organic solutes at ng detection limits and several orders of magnitude linearity (both features that are presently not available in detectors for reverse-phase HPLC). Also, direct quantitation of solutes in water based samples has been demonstrated by the quantitation of ethanol in alcoholic beverages, as shown in Table 7.

TABLE 7

The determination of ethanol concentration in alcoholic beverages by reverse-phase HPLC with water as a mobile phase and flame ionization detection.

| Alcoholic Beverage | Label value (vol %) | Measured value (vol % ± SD[a]) |
| --- | --- | --- |
| Whiskey | 50 | 49 ± 0.5 |
| Rum | 40 | 41 ± 1 |
| Red wine | 13 | 13 ± 0.5 |
| Beer | 5.6 | 5.5 ± 0.1 |

[a]RSDs were based on triplicate determinations of each beverage.

Preparative separations, etc. can also be achieved using the present invention. FIGS. 11 & 12A–12C are charts illustrating detector responses to various phenols (FIG. 11) and amino acids (FIGS. 12A–12C) versus retention time. As shown, it is possible, by controlling the surface tension and polarity of water, to process large scale separations using water and sorbents in order to separate desired compounds from undesired compounds.

Example 8

Degradation of Explosives

Figure 13:
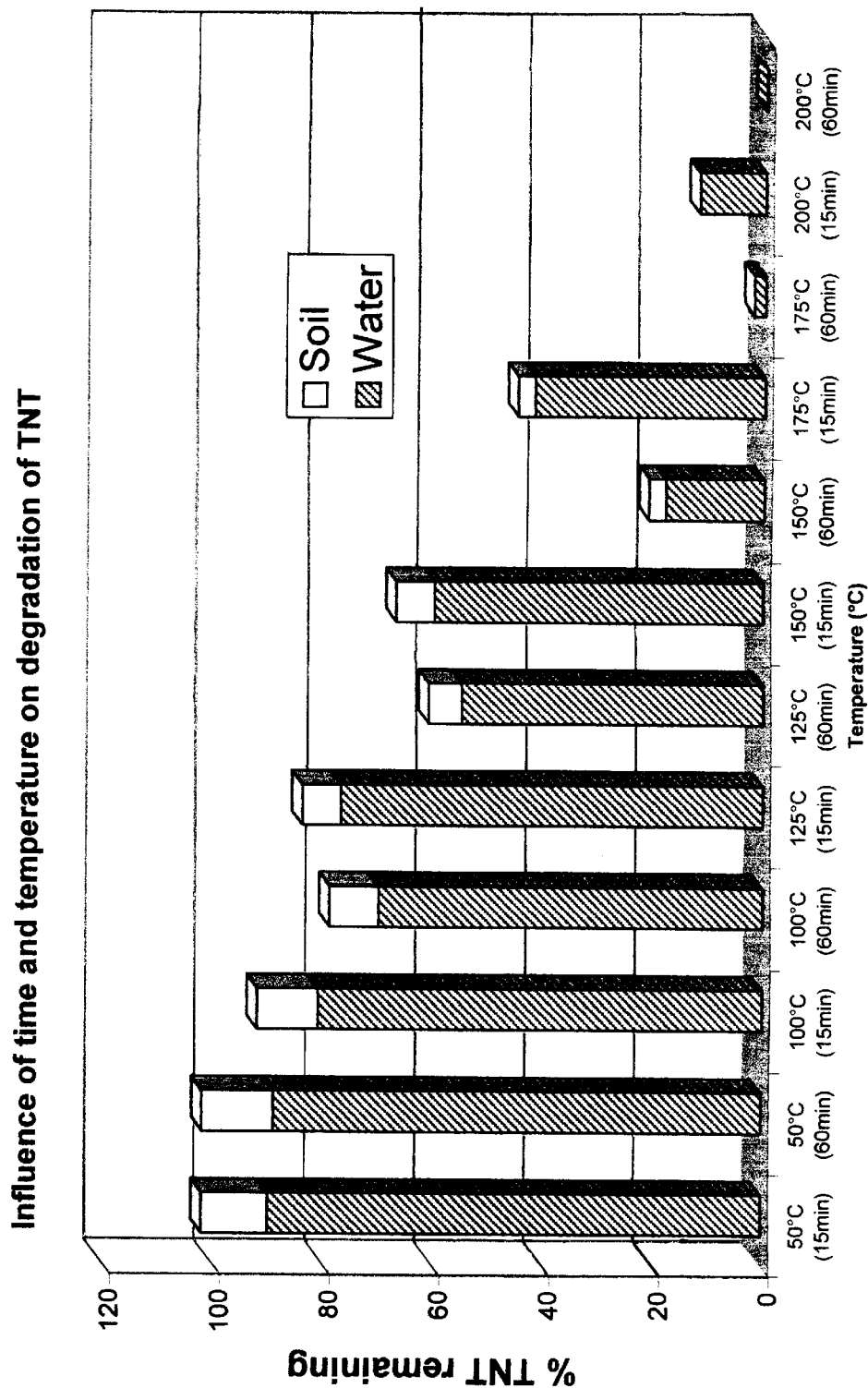
FIG. 13 shows the influence of time and temperature on degradation of TNT using subcritical water.
Figure 14:
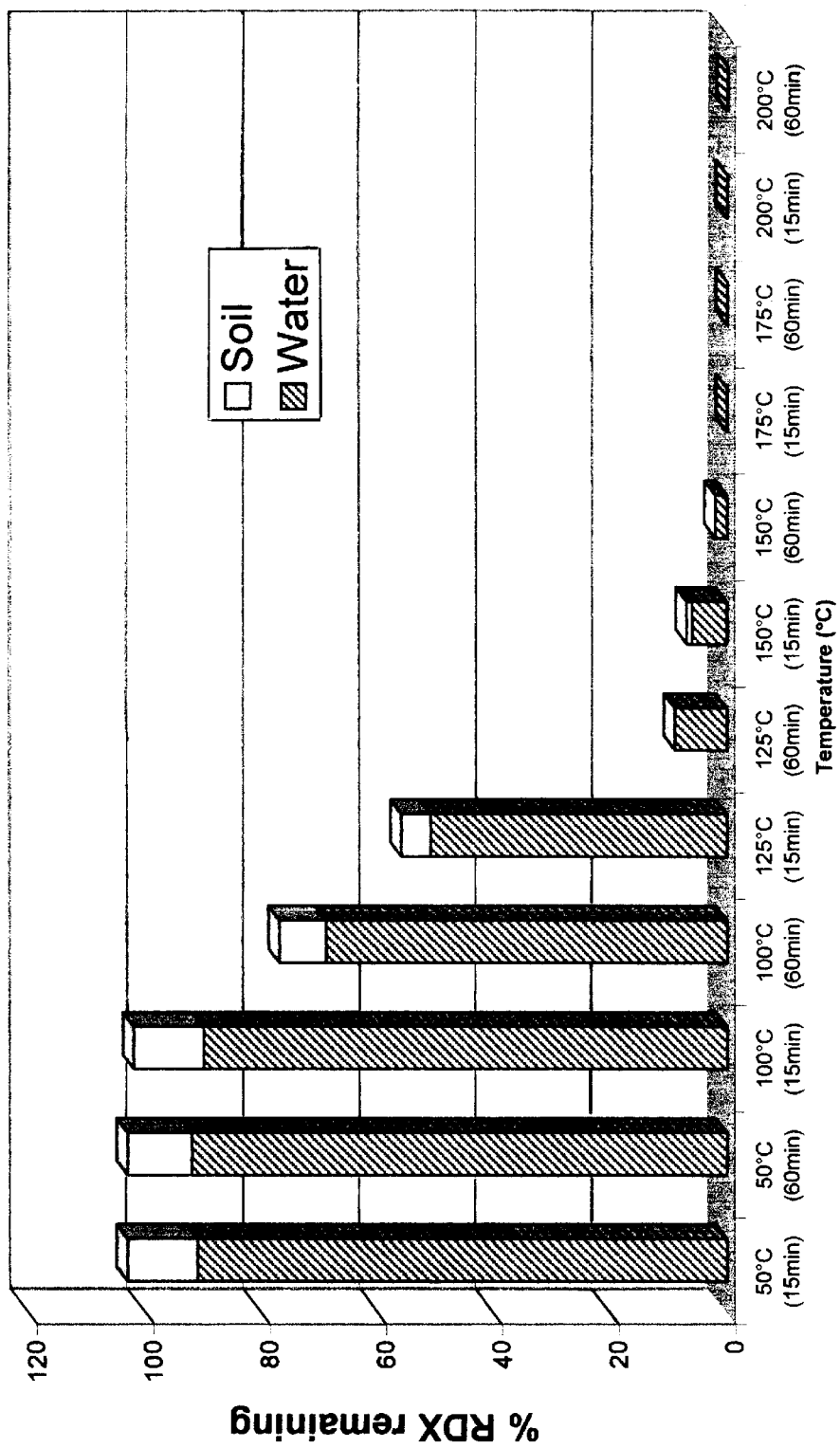
FIG. 14 shows the influence of time and temperature on degradation of RDX using subcritical water.
Figure 15:
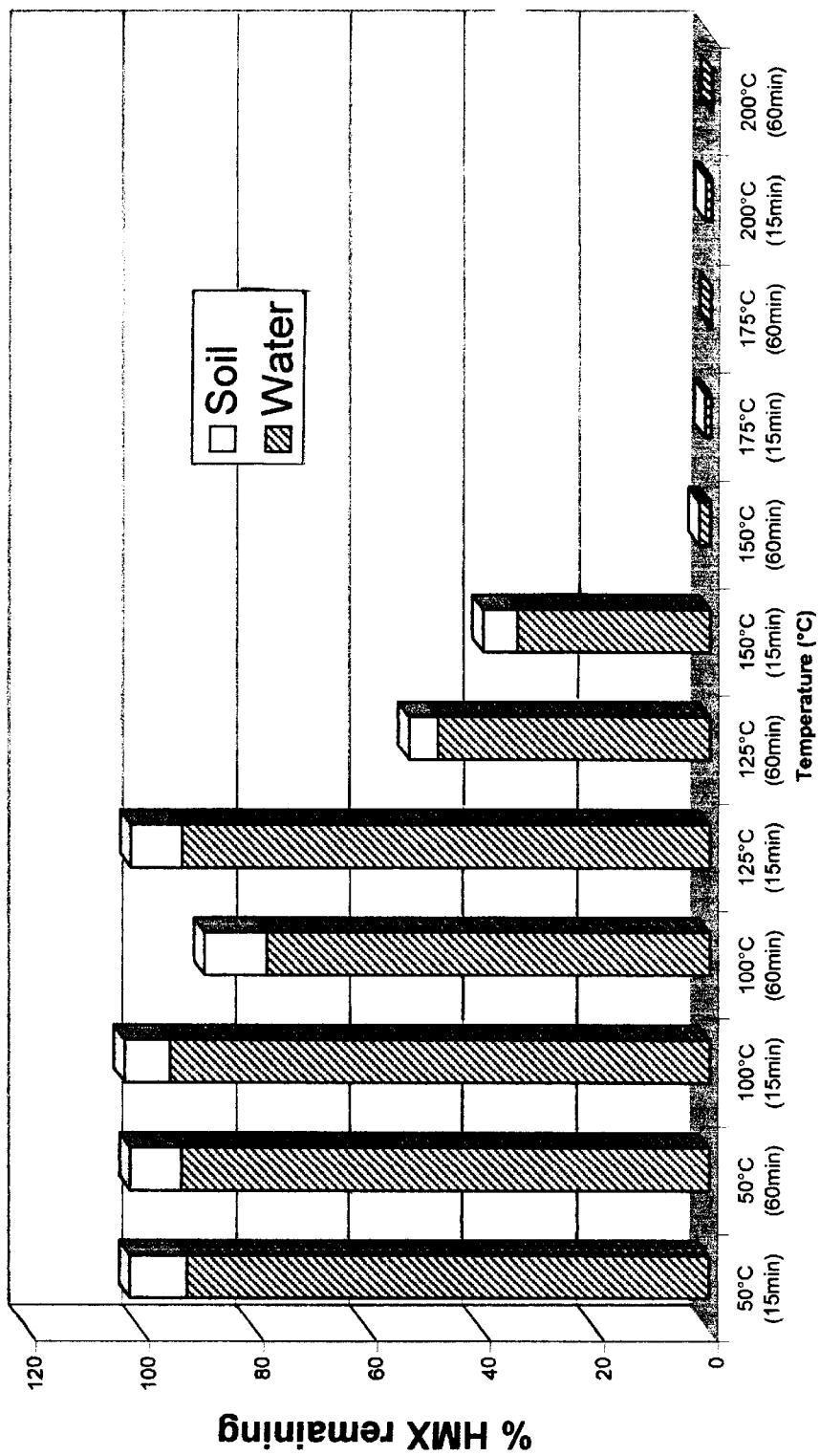
FIG. 15 shows the influence of time and temperature on degradation of HMX using subcritical water.

Energetic materials (e.g., explosives) like TNT, HMX, and RDX can be removed from soils and chemically degraded in a single step. Table 8 shows the removal efficiency of treating 4 kg of contaminated soil with 4 L of subcritical water at 275° C. water for 60 minutes in an 8 L reaction vessel. Additionally, FIGS. 13, 14, and 15 show the impact of both water temperature and time on the degradation of these compounds. The most difficult material to degrade, TNT, required only 200° C. and 1 hour to reduce the level in both the soil and the water used to extract the material to less than 0.1% of the original levels.

TABLE 8

Degradation Of high explosives (TNT, HMX, and RDX) from 4 kg of contaminated soil in 60 minutes with hot/liquid water at 275° C.

| High explosive | Soil conc. before treatment (mg/kg) | Soil conc. after treatment (mg/kg) | Total % remaining (in soil and water) |
| --- | --- | --- | --- |
| TNT | 12,000 | 1 | 0.04% |
| HMX | 800 | 2 | 1.7% |
| RDX | 3,500 | <1 | 0.06% |

Example 9

Degradation/Dechlorination of Chlorophenols

Figure 16:
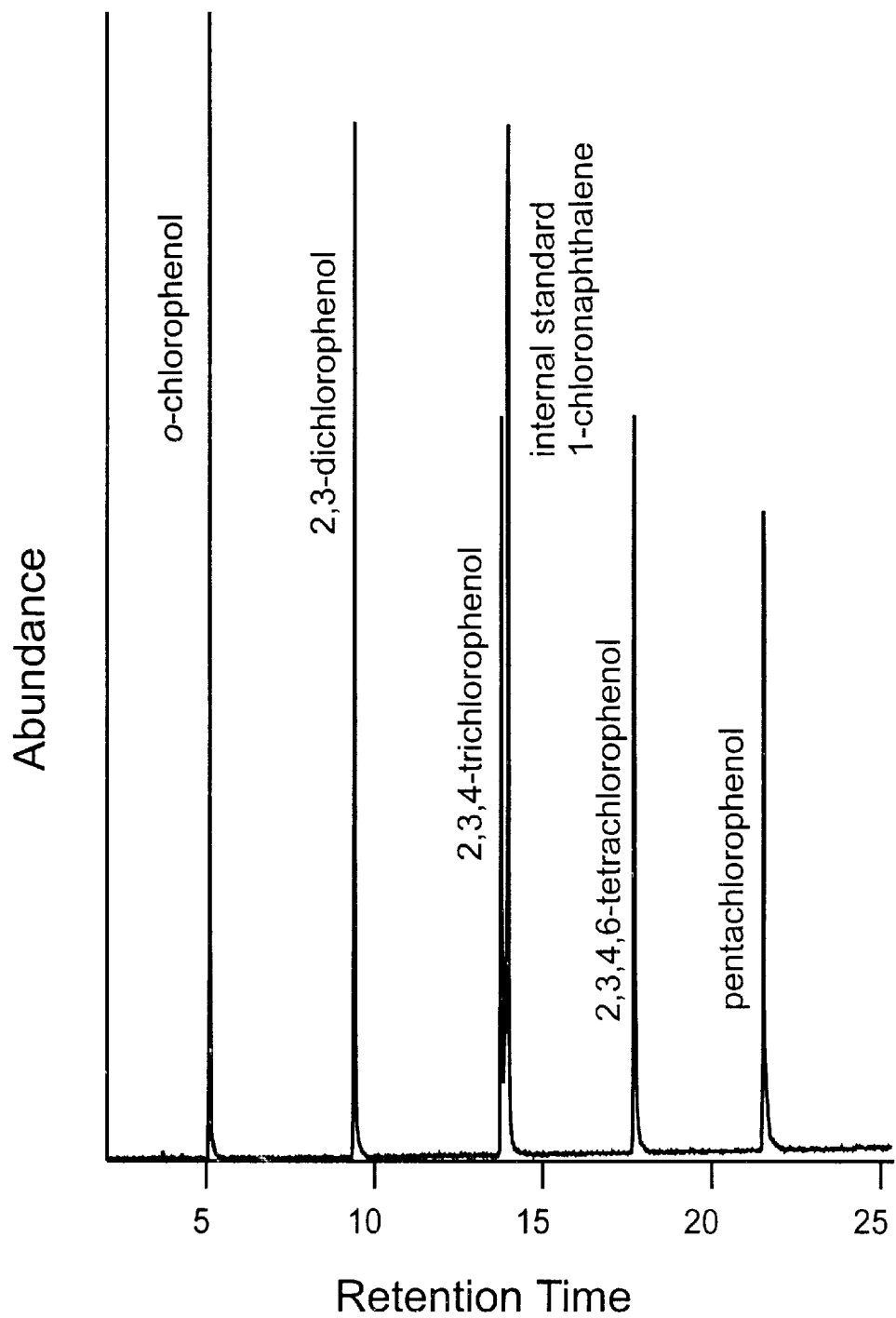
FIG. 16 is the chromatogram (GC/MS) of 5 chlorophenols, with an internal standard, tested for degradation/dechlorination using subcritical water.
Figure 17:
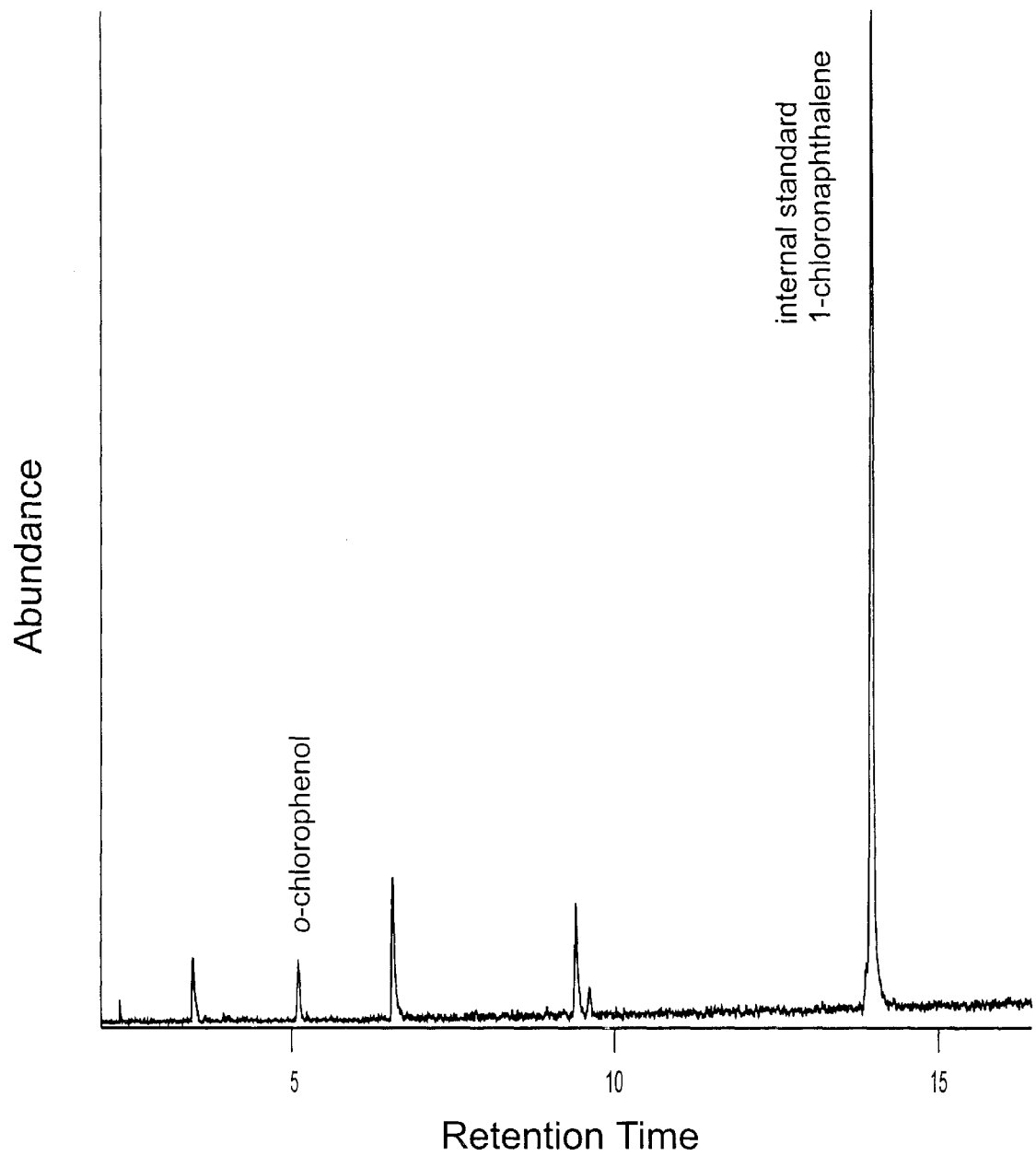
FIG. 17 is a chromatogram (GC/MS) of an extract of the chlorophenol samples of FIG. 16 after treatment with subcritical water at 300° C. for 4 hours.

Subcritical water is effective for degradation/dechlorination of chlorophenols. A mixture of 5 chlorophenols (o-chlorophenol, 2,3-dichlorophenol, 2,3,4-trichlorophenol, 2,3,4,5-tetrachlorophenol, and pentachlorophenol) in 3 ml water was placed in a 4 ml stainless steel cell. The cell was heated to a temperature from 300° C. to 350° C. with the temperature maintained for from 4 to 8 hours. FIG. 16 shows the chromatograms from a GC/MS of the 5 chlorophenols with an internal standard, and FIG. 17 is the chromatogram from a GC/MS of the sample after treatment at 300° C. for 4 hours. As can be seen in FIG. 17, this treatment results in the near total dechlorination of the chlorophenols. The small amounts of the mono- and dichlorophenols noted are the result of the dechlorination of the higher chlorine-containing compounds. Similar experiments with the same 5 chlorophenols in water at 350° C. for 8 hours resulted in levels below detection levels of the 5 chlorophenols noted in the resultant water.

Example 10

Degradation/Dechlorination of PCBs

Figure 18:
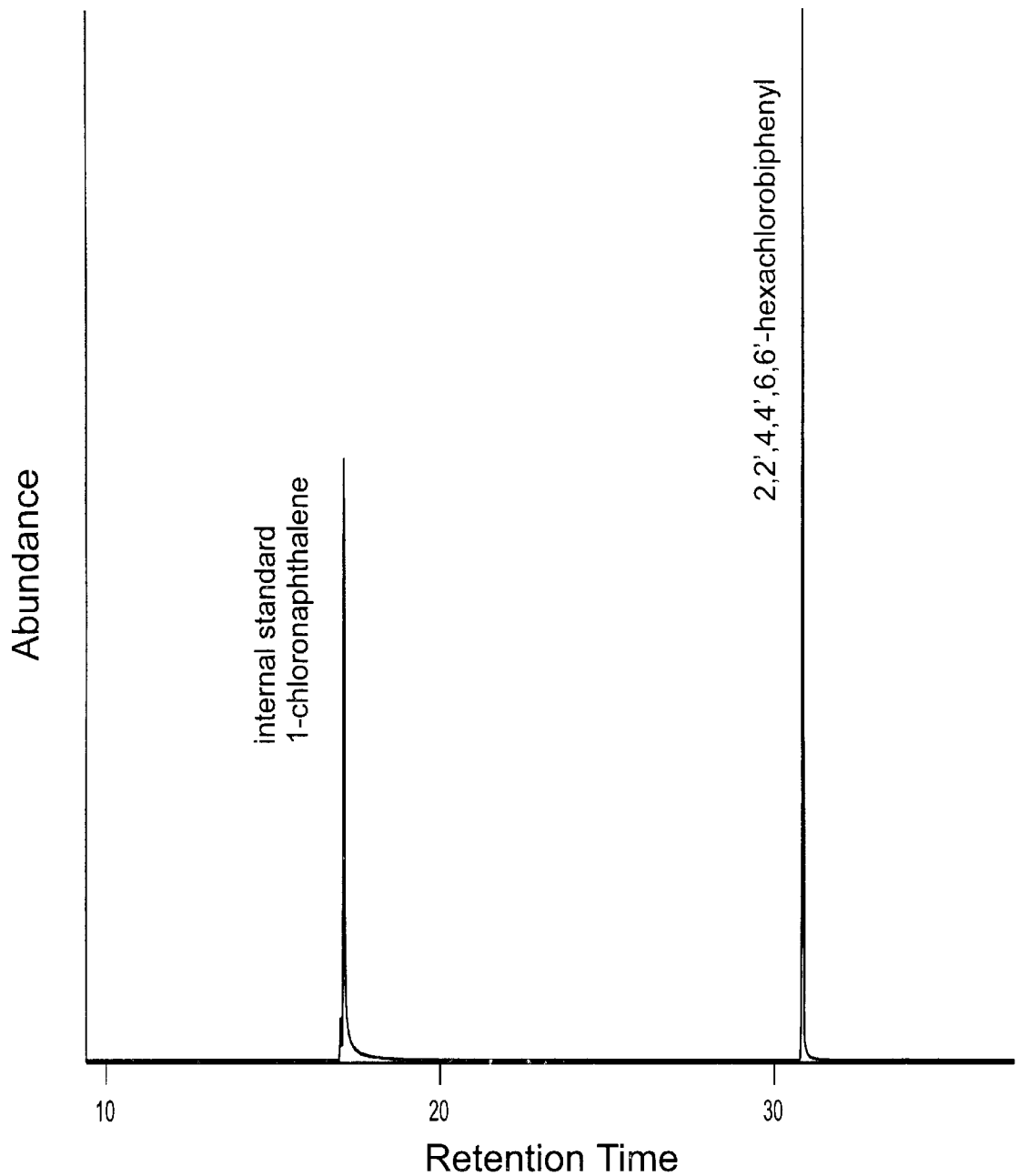
FIG. 18 is a chromatogram (GC/MS) of a sample containing the PCB 2,2',4,4',6,6'-hexachlorobiphenyl.
Figure 19:
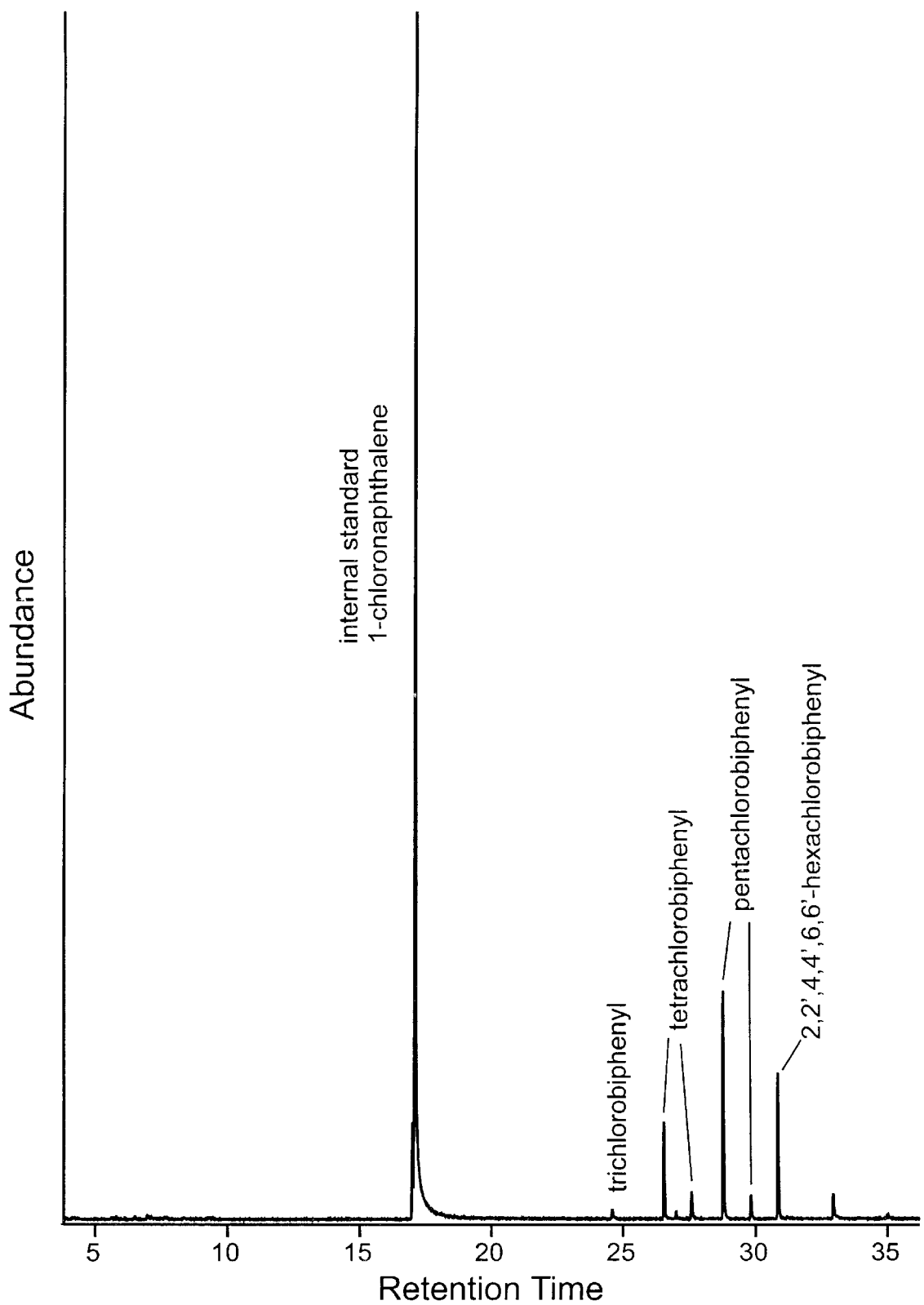
FIG. 19 is the chromatogram (GC/MS) of sample containing the PCB 2,2',4,4',6,6'-hexachlorobiphenyl after exposure to subcritical water at 350° C. for 4 hours, which shows >99% degradation of 2,2'4,4'6,6'-hexachlorobiphenyl.

Subcritical water is also effective for degradation/dechlorination of PCBs. A solution of 2,2',4,4',6,6'-hexachlorobiphenyl in water was placed in a 4 ml stainless steel cell with 3 ml water. The cell was heated to 300–350° C. for 2 to 4 hours. FIG. 18 is a chromatogram from a GC/MS of the water solution containing the PCB 2,2',4,4', 6,6'-hexachlorobiphenyl, and FIG. 19 is the chromatogram from a GC/MS after exposure to subcritical water at 350° C. for 4 hours, which shows >99% degradation of 2,2'4,4',6, 6'-hexachlorobiphenyl. At lower temperatures and exposure times, partial degradation/dechlorination of 2,2'4,4',6,6'-hexachlorobiphenyl to lower chlorinated compounds (pentachlorobiphenyl, tetrachlorobiphenyl, and trichlorobiphenyl) occurs.

Example 11

Degradation/Dehalogenation of Halogenated Solvents

Subcritical water is effective for degradation/dehalogenation of halogenated solvents. A 4 ml stainless steel cell containing 3 ml of water and one of the test solvents (at mg levels) from Table 9 was placed in an oven at temperatures from 225° C. to 300° C. for 4 to 11 hours. Table 9 shows the results. Additionally, a bromine-containing solvent, dibromoethane, was degraded by greater than 90% at a temperature of 300° C. for 4 hours.

TABLE 9

Degradation of Halogenated Solvents in Subcritical Water.

| Solvent | Temperature (° C.) | Exposure time (hours) | % degraded |
|---|---|---|---|
| Trichloroethylene | 300 | 4 | >90% |
| 1,2-dichloroethane | 250 | 4 | >99% |
| 1,1,2,2-tetrachloroethane | 225 | 4 | >95%[(1)] |
| 1,2,4-trichlorobenzene | 300 | 11 | 80% |

[(1)]1,1,2,2-tetrachloroethane degrades to trichloroethene.

Example 12

Degradation of Halogenated Polymers

Figure 20:
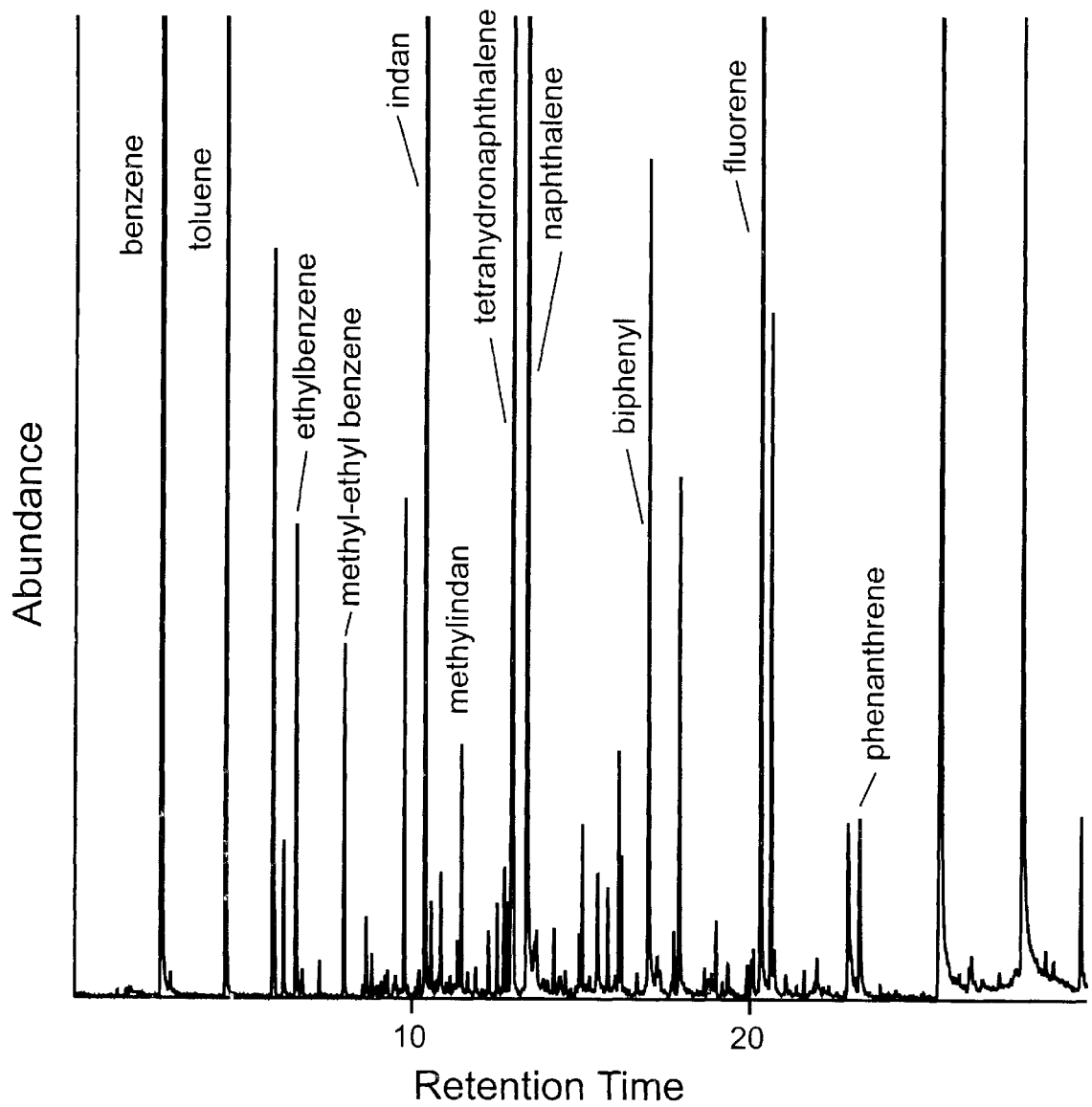
FIG. 20 is a chromatogram (GC/MS) of degradation products from polyvinyl chloride observed after reaction with subcritical water at a temperature of 250° C. for 4 hours.

Enhanced chemical reactivity is shown in subcritical water with the degradation of halogenated plastics including polyvinylchloride (PVC). PVC was placed in a 4 ml stainless steel cell with water at temperatures from 125° C. to 350° C. At a temperature of 125° C. for 2 hours, no degradation of the PVC was observed. As the water temperature was increased to 250° C. for 4 hours, a large number of degradation products was observed (FIG. 20). The unique properties of this reaction resulted in a hydrocarbon stream from the degraded plastic that is free of undesired chlorine-containing organics which result from other processes.

Example 13

Degradation of Non-halogenated Polymers

Figure 21:
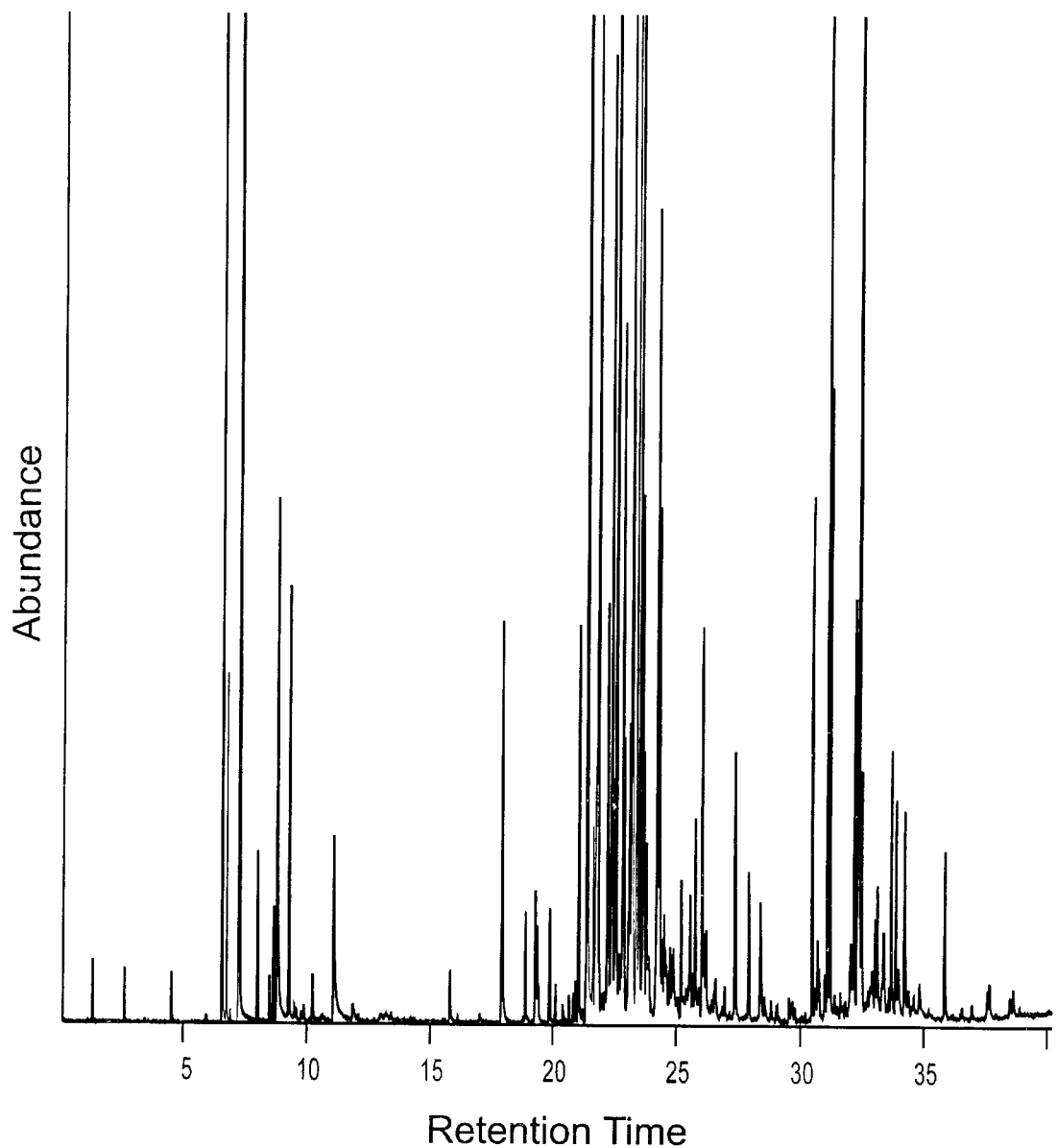
FIG. 21 chromatogram (GC/MS) of the reaction products of degradation of polystyrene in subcritical water.

Enhanced chemical reactivity is shown in subcritical water with the degradation of non-halogenated plastics including polystyrene. Polystyrene was placed in a 4 ml stainless steel vessel with water at a temperature of 250° C. for 1 hour. Chromatographic analysis (GC/MS) of the reaction products are shown in FIG. 21. The chromatogram shows primarily substituted benzenes, which are suitable for chemical feedstocks.

Example 14

Selective Removal of Organic Compounds from Plastics

Figure 22:
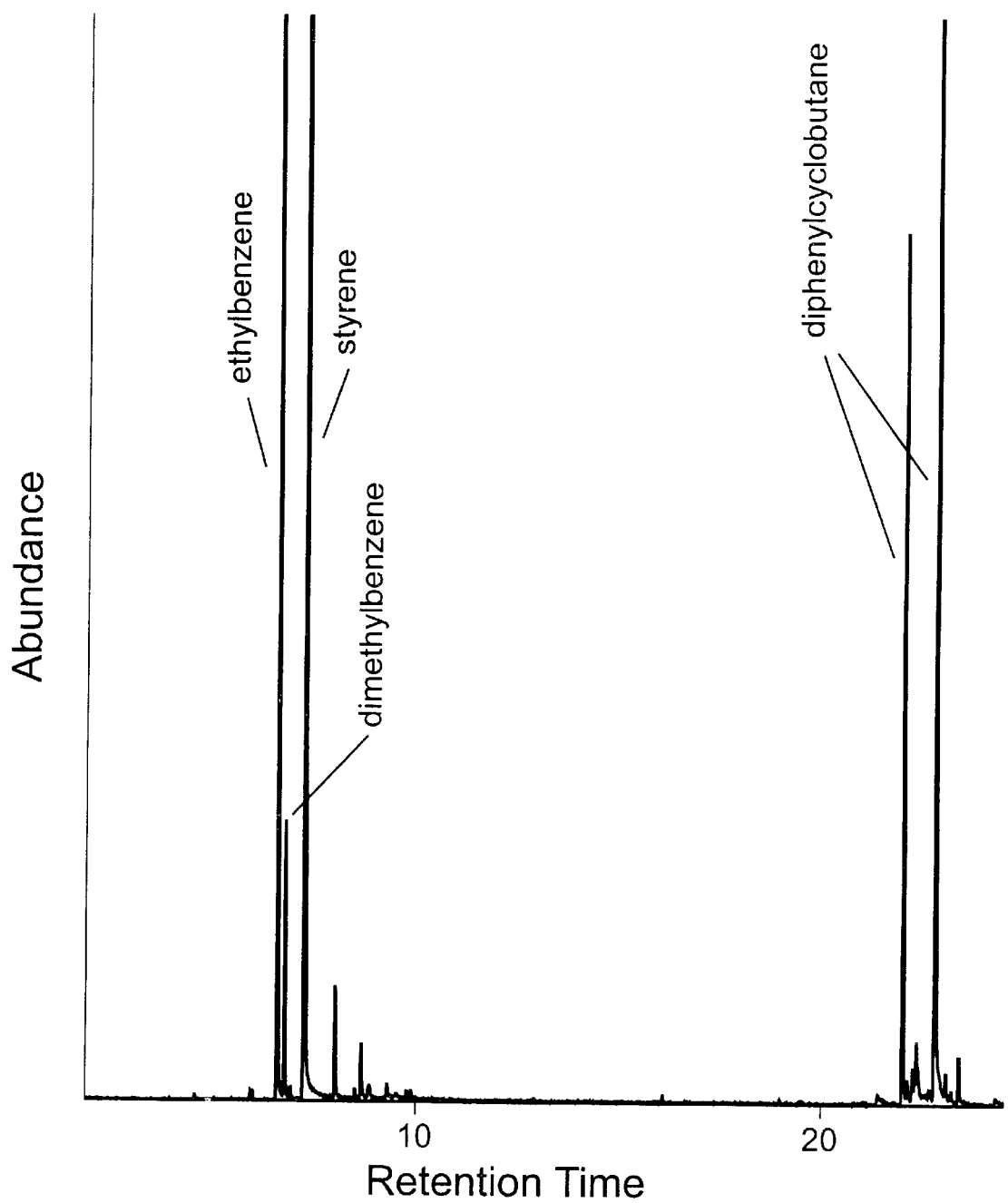
FIG. 22 shows the results of selective subcritical water extraction at 200° C. of styrene, alkyl benzene contaminants, and styrene dimers extracted from polystyrene without destruction of the polystyrene.
Figure 23:
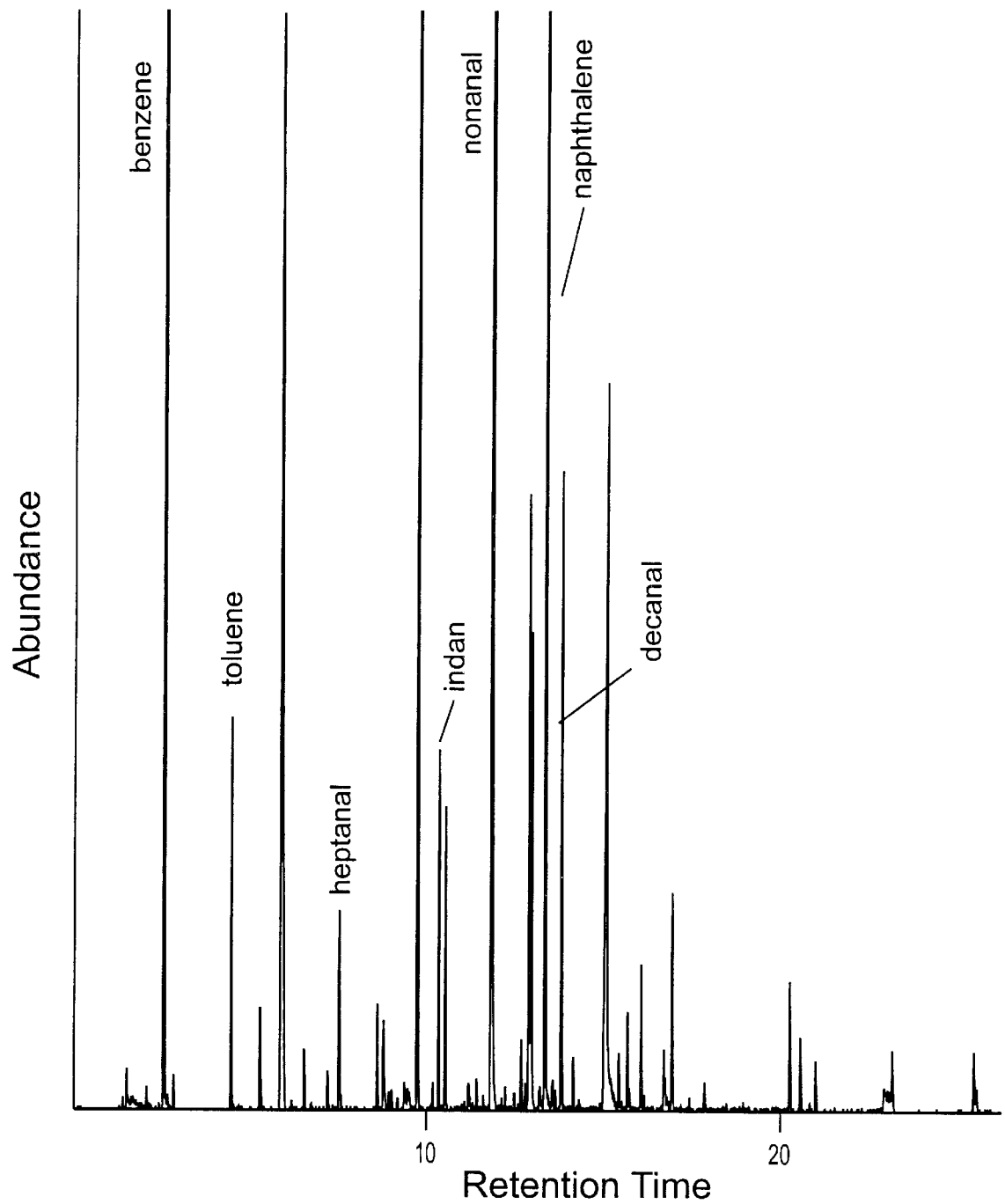
FIG. 23 shows the extraction products of hydrocarbon contaminants from a polyethylene bread bag with 250° C. subcritical water.

Subcritical water is effective for selective removal of undesirable organic compounds, such as synthesis by-products or starting monomers, from plastics. The plastic was placed in a 4 ml stainless steel cell with 3 ml of water and heated to a suitable temperature. FIG. 22 shows the selective subcritical water extraction at 200° C. of styrene, alkyl benzene contaminants, and styrene dimers extracted from polystyrene without destroying the polystyrene. FIG. 23 shows the extraction of hydrocarbon contaminants from a polyethylene bread bag with 250° C. subcritical water. FIGS. 22 and 23 were generated using a GC/MS. Extracted contaminants include the carcinogen benzene, as well as other aromatic hydrocarbons and aliphatic aldehydes.

Example 15

Removal of Organic Pollutants from Wastewater from Subcritical Water Processes The following demonstrates a method for "cleaning" water from subcritical water processes used to extract organic pollutants (e.g., PAHs, PCBs, pesticides, or other organic pollutants). If these organic pollutants are co-extracted with organic matter (e.g., humic matter) from soil or extracted organic matter from soils is added to subcritical water that contains organic pollutants, and the water is allowed to cool to room temperature, precipitation of the organic pollutants was noted. The precipitate/flocculate of the soil organic matter and the pollutant(s) forms naturally upon cooling. Table 10 shows the concentration of the organic pollutants in waste water before and after co-extraction with soil organic matter. This clearly indicates that co-precipitation of organic pollutants with soil organic matter on cooling water from subcritical conditions to ambient conditions offers a method to clean waste waters contaminated with organic pollutants.

The result was surprising in that the removal was much greater than the level of solubility of the compounds in clean water. This removal is much better than simple phase separation.

TABLE 10

Removal of pollutants co-extracted with organic matter.

| Pollutant | Solubility in water at 25° C. (mg/L) | Concentration of PAH in water (mg/L) | |
|---|---|---|---|
| | | Before precipitation | After precipitation |
| Fluorene | 1.90 | 1.31 | 0.05 |
| Phenanthrene | 1.18 | 4.40 | 0.02 |
| Anthracene | 0.075 | 2.23 | 0.01 |
| Fluoranthene | 0.265 | 3.31 | 0.01 |
| Pyrene | 0.148 | 5.80 | 0.01 |
| Benz[a]anthracene | 0.01 | 2.64 | <0.01 |
| Benzo[e]pyrene | 0.004 | 0.83 | <0.01 |
| Benzo[a]pyrene | 0.004 | 1.41 | <0.01 |
| Indeno[1,2,3-cd]pyrene | NA[1] | 1.72 | <0.01 |
| Benzo[ghi]perylene | <0.001 | 2.49 | <0.01 |

[1]NA = not available

Example 16

Method for Extracting and/or Degrading Organic Pollutants in situ

Figure 24:
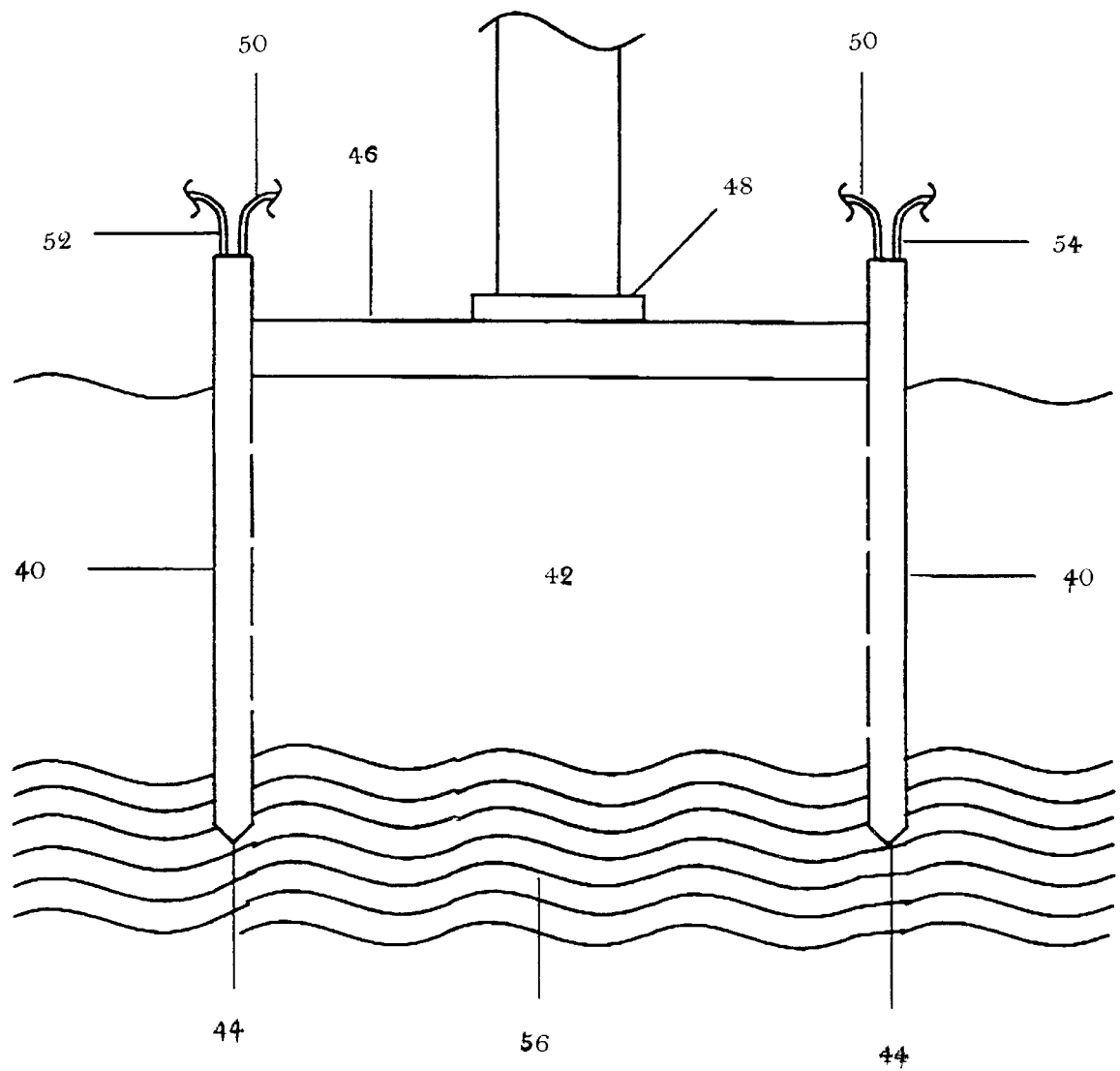
FIG. 24 shows a device for practicing a method of in situ extraction and/or degradation of pollutants using subcritical water.

The following example demonstrates a device and method for extracting and/or degrading organic pollutants in soil without requiring excavation of the soil (in situ remediation). The device is shown in FIG. 24. The device is an enclosure with two extraction/injection plates 40 on opposite sides of the treatment zone 42. The other two sides of the enclosure are regular plates. The extraction/injection plates 40 have a coolant outlet point 44 at one end. An upper sealing pressure plate 46 is attached between the extraction/injection plates 40. A drive unit 48 is attached to the pressure plate 46. Coolant injection lines 50 and water lines (water input lines 52 and water outlet lines 54) run through the extraction/injection plates 40. The device is driven into the soil and the coolant outlet points will define the seal zone 56.

The device is forced into the soil. The open end of the chamber is sealed by any of several methods including naturally-occurring clay or other solid material present below the soil. For example, the top (contaminated) layer of soil could be plowed and the undisturbed soil could act as the sealing layer. Otherwise, the base of the contaminated soil layer could be sealed by passing in liquid carbon dioxide or another substance which is either cold or will cool upon injection at the base of the chamber, which forms a seal of solid carbon dioxide (or other substance) and/or frozen soil water in the soil. For example, using a device as shown in FIG. 24, soil containing oil residues was completely cleaned by passing in carbon dioxide to freeze the bottom of the soil layer and subcritical water was used to extract the pollutants. A temperature of 200° C. and a pressure of 150 bar was achieved in the chamber. Any conditions suitable for subcritical water extraction/degradation may be used.

Alternative designs for the enclosure will also work. For example, the enclosure may be cylindrical with one extraction/injection "plate" surrounding the treatment area. Any design which allows for isolation of and seals the treatment area may be used. The device may be made of any material suitable for the treatment conditions.

Example 17

Figure 25:
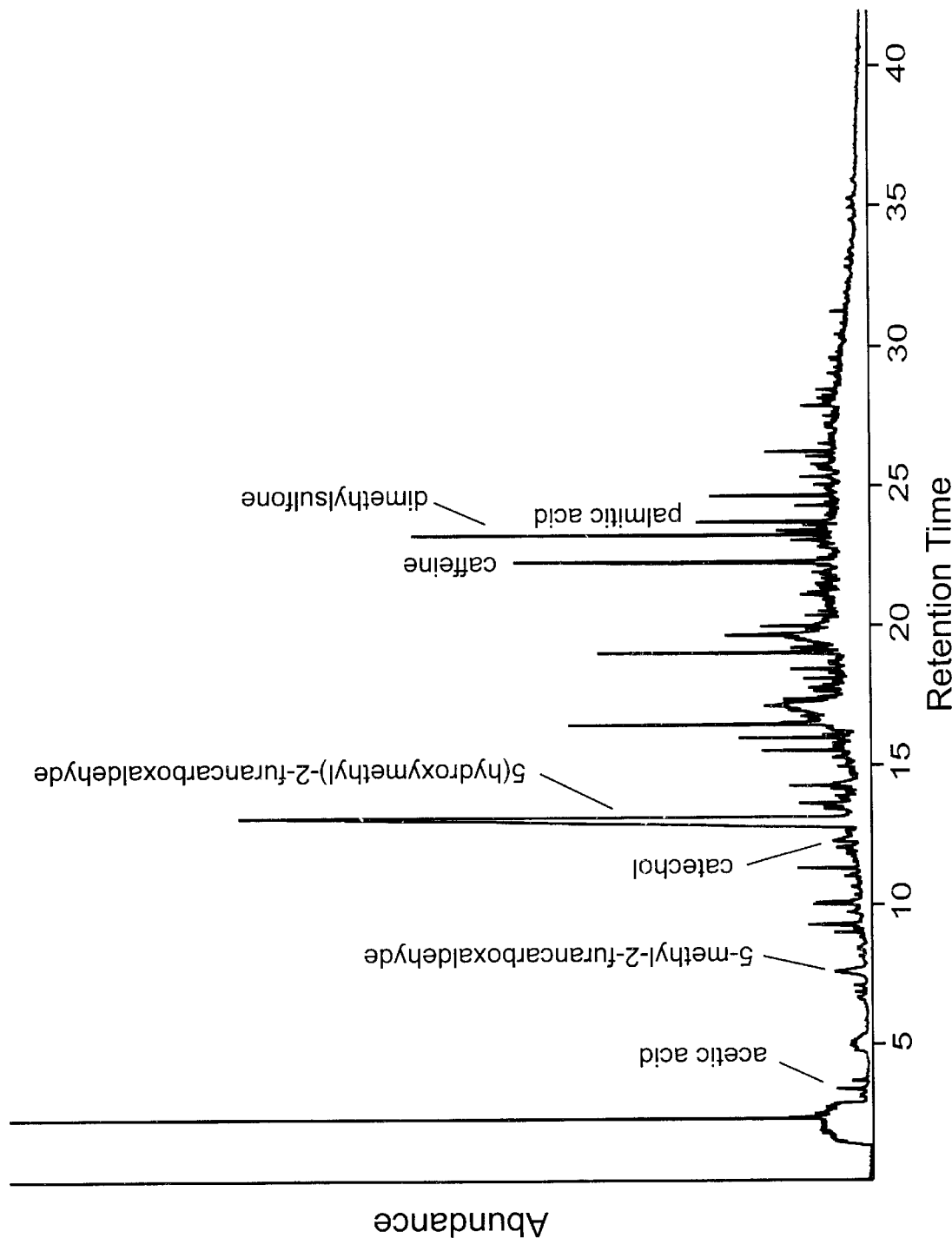
FIG. 25 is a chromatogram (GC/MS) of compounds taken from the subcritical water extract of green coffee beans.

Use of Subcritical Water for Extracting and/or Causing Reactions Resulting in Flavor and Fragrance Formation Extraction of natural products using subcritical water followed by, following, or simultaneously occurring with reactions gives rise to flavor and fragrance formation. The process can be carried out with or without the addition of oxygen or air and can be used to produce flavors and fragrances in food and other industries. For example, treatment of barley seeds with water at 175° C. without oxygen or air gave an extract with a pleasant perfume of cooked cereal. Green coffee beans were treated with water at 180° C. This produced an extract with the perfume of coffee made from roasted beans. FIG. 25 shows a GC/MS chromatogram of the compounds from the subcritical water extract of the green coffee beans and shows compounds typical of coffee produced by the conventional process of roasting, grinding, and brewing coffee. The process may be useful as a method of producing coffee for drinking or instant coffee granules or flavors for use in food or beverage processing.

Example 18

Extraction/Degradation of Chemical Warfare Agents

Chemical warfare agents contain similar chemical functional groups to the compounds in the Examples above, therefore, they are expected to extract and degrade from materials in a similar manner.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method for removing desired compounds from water comprising:
    generating organic material useful for removing desired compounds by contacting subcritical water with naturally-occurring organic matter and
    contacting the generated organic material with water containing the desired compounds wherein the desired compounds are capable of being adsorbed by the generated organic material.

2. The method of claim 1 further comprising cooling the water to cause precipitation of the desired compounds with the naturally-occurring organic matter.

3. The method of claim 1 further comprising recycling the cleaned water for reuse.

4. The method of claim 1 wherein the naturally-occurring organic matter is selected from the group consisting of soil, peat, coal, agricultural waste, and plant tissue.

5. A method for separating desired compounds from a liquid material comprising:
    adding water to a liquid material containing the desired compounds;
    heating the water, before or after addition to the material, to within a subcritical temperature range while maintaining the water in a liquid state with sufficient pressure;
    contacting the subcritical water and material for a time sufficient to separate the desired compounds
    wherein the desired compounds are soluble in subcritical water.

6. The method of claim 5 further comprising varying the temperature of the subcritical water while in contact with the material in order to selectively separate classes of the desired compounds.

7. A method for extracting desired compounds from a polymer comprising:
    adding water to a polymer containing the desired compounds;
    heating the water, before or after addition to the polymer, to within a subcritical temperature range while maintaining the water in a liquid state with sufficient pressure;
    contacting the subcritical water and polymer for a time sufficient to extract the desired compounds
    wherein the desired compounds are soluble in subcritical water.

8. The method of claim 7 wherein the polymer is selected from the group consisting of polystyrene and polyethylene.

9. The method of claim 7 wherein the polymer is used for packaging of biological materials.

10. The method of claim 9 wherein the biological materials are selected from the group consisting of food, blood, and medical supplies.

11. The method of claim 7 wherein the desired compounds are selected from the group consisting of unwanted contaminants, contaminants from the polymerization process, unreacted monomers, and partially reacted monomers.

12. A method for extracting nitrogen-containing hydrocarbons from a liquid, solid, or semi-solid material comprising:
    adding water to the liquid, solid, or semi-solid material containing the nitrogen-containing hydrocarbons;
    heating the water, before or after addition to the material, to within a subcritical temperature range while maintaining the water in a liquid state with sufficient pressure;
    contacting the subcritical water and material for a time sufficient to extract the nitrogen-containing hydrocarbons from the material
    wherein the nitrogen-containing hydrocarbons are soluble in subcritical water.

13. The method of claim 12 wherein the nitrogen-containing hydrocarbons are explosives and the explosives are selected from the group consisting of 2,4,6-trinitrotoluene (TNT), octahydro-1,3,5,7-tetranitro-1,3,5,7-tetrazocine (HMX), and hexahydro-1,3,5-trinitro-1,3,5-triazine (RDX).

14. A method for chemically degrading polymers comprising adding water to polymers;

heating the water to subcritical conditions while maintaining the water in liquid state with application of a suitable amount of pressure before or after addition to the polymers;

contacting the polymers and the subcritical water for a sufficient length of time to degrade the polymers to a desired degree wherein the polymers are capable of degradation under subcritical water conditions.

15. The method of claim 14 wherein the polymers are selected from the group consisting of polyvinyl chloride and polystyrene.

16. A method for chemically degrading organics or polymers comprising adding water to organics, material containing organics, or polymers;

heating the water to subcritical conditions while maintaining the water in liquid state with application of a suitable amount of pressure before or after addition to the organics, material containing organics, or polymers;

contacting the organics or polymers and the subcritical water for a sufficient length of time to degrade the organics or polymers to a desired degree wherein the organics or polymers are capable of degradation under subcritical water conditions and wherein the degradation involves dehalogenation.

17. A method for extracting and degrading organics comprising adding water to a material containing organics;

heating the water before or after addition to subcritical conditions while maintaining the water in a liquid state with sufficient pressure;

contacting the subcritical water and material for sufficient length of time to simultaneously extract and degrade, sequentially extract and degrade, or sequentially degrade and extract the organics and/or degradation products thereof, wherein the organics and/or degradation products thereof are extracted from the material into the subcritical water and wherein the organics and/or degradation products thereof are soluble in subcritical water and the organics are capable of degradation under subcritical water conditions.

18. A method for extracting and reacting organics comprising adding water to a material containing organics;

heating the water before or after addition to subcritical conditions while maintaining the water in a liquid state with sufficient pressure;

contacting the subcritical water and material for sufficient length of time to simultaneously extract and react, sequentially extract and react, or sequentially react and extract the organics and/or reaction products thereof, wherein the organics and/or reaction products thereof are extracted from the material into the subcritical water and the organics and/or reaction products thereof react with water and wherein the organics and/or reaction products thereof are soluble in subcritical water and reactive under subcritical water conditions.

19. The method of claim 18 wherein the organics are biologically active compounds.

20. The method of claim 19 wherein the biologically active compounds are selected from the group consisting of flavors and fragrances.

21. A method for removing and/or degrading contaminants in situ comprising heating and pressurizing water to subcritical conditions;

enclosing an area of the in situ bulk material containing the contaminants;

contacting the enclosed area of the bulk material with subcritical water for a sufficient length of time to remove and/or degrade the contaminants and/or degradation products thereof while maintaining the water at subcritical conditions wherein the contaminants and/or degradation products thereof are soluble in subcritical water and the contaminants are capable of removal and/or degradation under subcritical water conditions.

22. The method of claim 21 wherein enclosing an area is accomplished using a device comprising an enclosure with an open end wherein the open end is inserted into the bulk material, a driving device, and at least one opening in the enclosure through which subcritical water may enter to contact the bulk material.

23. The method of claim 22 wherein the enclosing of the area comprises inserting the device into the bulk material and sealing the open end of the device.

24. The method of claim 23 wherein the sealing of the open end of the device is accomplished by driving the device into clay or solid material adjacent to the open end of the enclosure.

25. The method of claim 23 wherein the sealing of the open end of the device is accomplished by freezing the bulk material, or water within the bulk material adjacent to the open end of the device.

26. The method of claim 23 wherein the sealing of the open end of the device is accomplished by freezing, by injecting carbon dioxide or other substance which is either cold or will cool upon injection, the bulk material, water within the bulk material, or carbon dioxide or other substance.

27. A method for chemically degrading one or more of pesticides, chlorophenols, chemical warfare agents, polychlorinated biphenyls, or halogenated solvents comprising adding water to one or more of pesticides, chlorophenols, chemical warfare agents, polychlorinated biphenyls, or halogenated solvents or material containing one or more of pesticides, chlorophenols, chemical warfare agents, polychlorinated biphenyls, or halogenated solvents;

heating the water to subcritical conditions while maintaining the water in a liquid state with application of a suitable amount of pressure before or after addition to the one or more of pesticides, chlorophenols, chemical warfare agents, polychlorinated biphenyls, or halogenated solvents or material containing one or more of pesticides, chlorophenols, chemical warfare agents, polychlorinated biphenyls, or halogenated solvents;

contacting the one or more of pesticides, chlorophenols, chemical warfare agents, polychlorinated biphenyls, or halogenated solvents and the subcritical water for a sufficient length of time to degrade the one or more of pesticides, chlorophenols, chemical warfare agents, polychlorinated biphenyls, or halogenated solvents to a desired degree wherein the one or more of pesticides, chlorophenols, chemical warfare agents, polychlorinated biphenyls, or halogenated solvents are capable of degradation under subcritical water conditions.

28. A method for extracting and degrading one or more of TNT, HMX, or RDX comprising adding water to a material containing one or more of TNT, HMX, or RDX;

heating the water before or after addition to subcritical conditions while maintaining the water in a liquid state with sufficient pressure;

contacting the subcritical water and material for sufficient length of time to simultaneously extract and degrade, sequentially extract and degrade, or sequentially degrade and extract the one or more of TNT, HMX, or RDX and/or degradation products thereof, wherein the one or more of TNT, HMX, or RDX and/or degradation products thereof are extracted from the material into the subcritical water.

* * * * *